US011239647B2

(12) United States Patent
Davis et al.

(10) Patent No.: US 11,239,647 B2
(45) Date of Patent: Feb. 1, 2022

(54) SYSTEM FOR COUPLING ACCESSORIES AND/OR COMPONENTS

(71) Applicant: Christopher Darrell Davis, Antioch, CA (US)

(72) Inventors: Christopher Darrell Davis, Antioch, CA (US); Adam Loren Freund, Bozeman, MT (US); Christopher James Garman, Morgantown, WV (US)

(73) Assignee: Christopher Davis, Antioch, CA (US)

( * ) Notice: Subject to any disclaimer, the term of this patent is extended or adjusted under 35 U.S.C. 154(b) by 0 days.

(21) Appl. No.: 16/407,169

(22) Filed: May 8, 2019

(65) Prior Publication Data

US 2019/0348829 A1 Nov. 14, 2019

Related U.S. Application Data

(60) Provisional application No. 62/668,397, filed on May 8, 2018.

(51) Int. Cl.
| | |
|---|---|
| *H02H 3/08* | (2006.01) |
| *H01H 9/08* | (2006.01) |
| *H02H 1/00* | (2006.01) |
| *H02B 1/48* | (2006.01) |
| *H01M 50/20* | (2021.01) |

(52) U.S. Cl.
CPC ............... *H02H 3/08* (2013.01); *H01H 9/08* (2013.01); *H01M 50/20* (2021.01); *H02B 1/48* (2013.01); *H02H 1/0061* (2013.01); *H01M 2220/10* (2013.01)

(58) Field of Classification Search
USPC ...................................... 340/425.1
See application file for complete search history.

(56) References Cited

U.S. PATENT DOCUMENTS

| | | | | |
|---|---|---|---|---|
| 2006/0237439 | A1* | 10/2006 | Norwood | A61L 9/03 219/506 |
| 2008/0196936 | A1* | 8/2008 | Yamamoto | H01R 25/006 174/520 |
| 2012/0007555 | A1 | 1/2012 | Buckow | |
| 2014/0362559 | A1* | 12/2014 | Chien | F21S 8/033 362/95 |
| 2018/0316145 | A1* | 11/2018 | McKiernan | H01R 25/006 |

\* cited by examiner

*Primary Examiner* — Brent Swarthout

(57) ABSTRACT

A baseplate is attachable to a structure in the vicinity of an electrical power source. Optionally, the baseplate may be shaped so that when attached to the structure, the baseplate lies on at least one edge of an opening. The baseplate may have a plurality of connection points for connecting accessories. In different embodiments, the baseplate or faceplate system (which may be modular) attaches to a junction box, and/or may be installed in an opening for a light switch and/or outlet. Optionally, accessories and/or other electrical components may communicate with one another via the baseplate. Optionally, accessories and/or other electrical components may share power with one another, via the baseplate. Optionally, the accessories, the baseplate and/or other electrical components may communicate with a remote device.

32 Claims, 30 Drawing Sheets

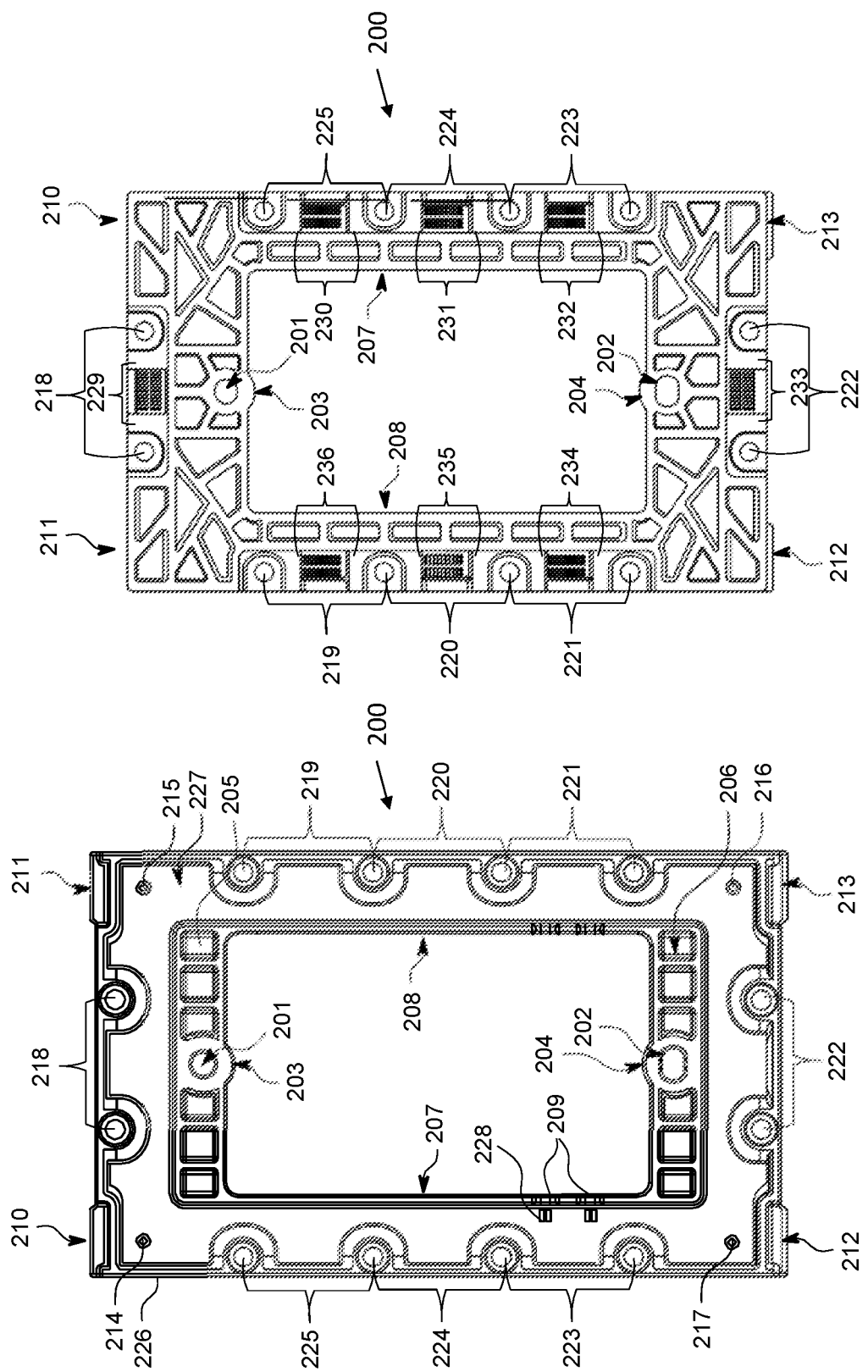

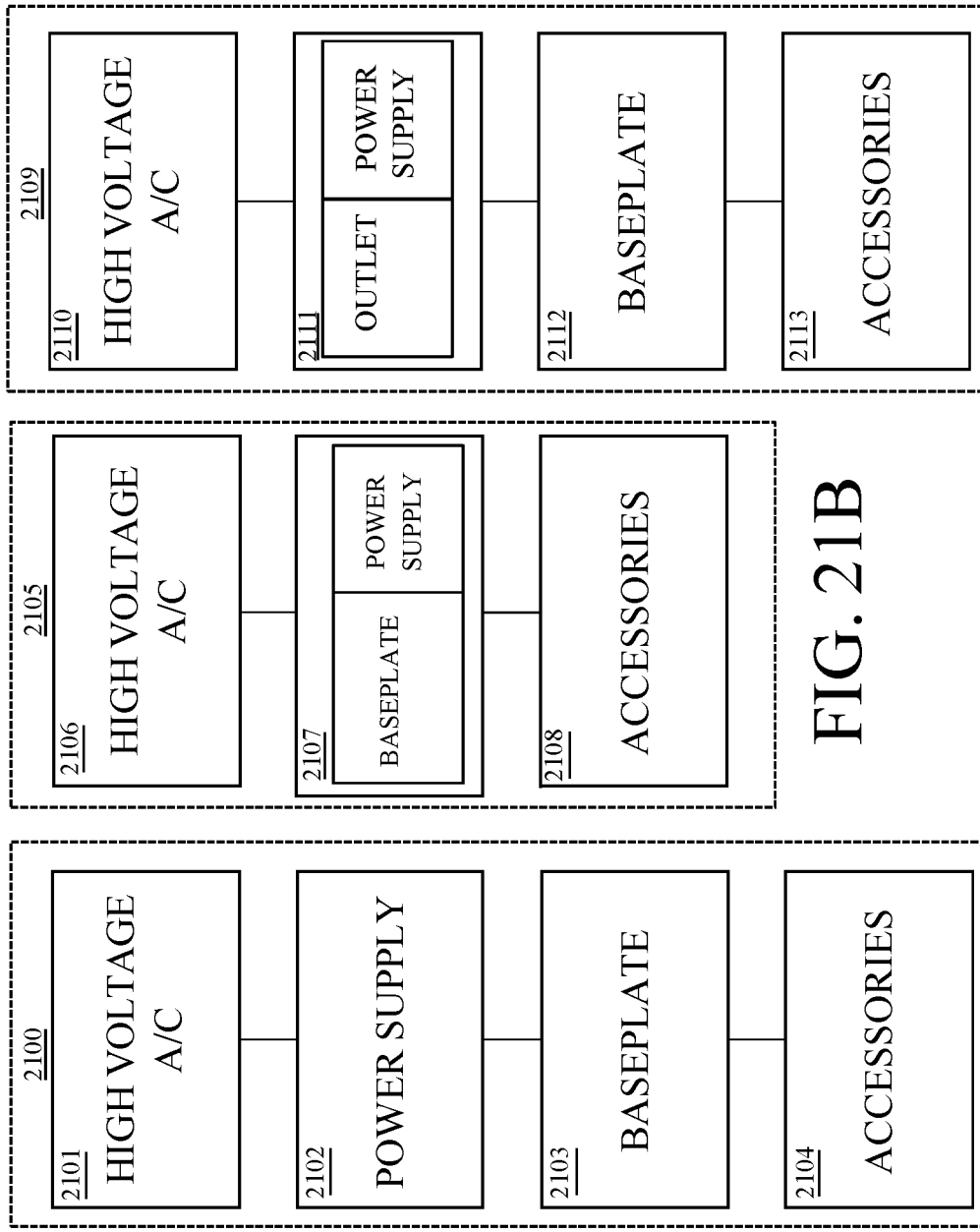

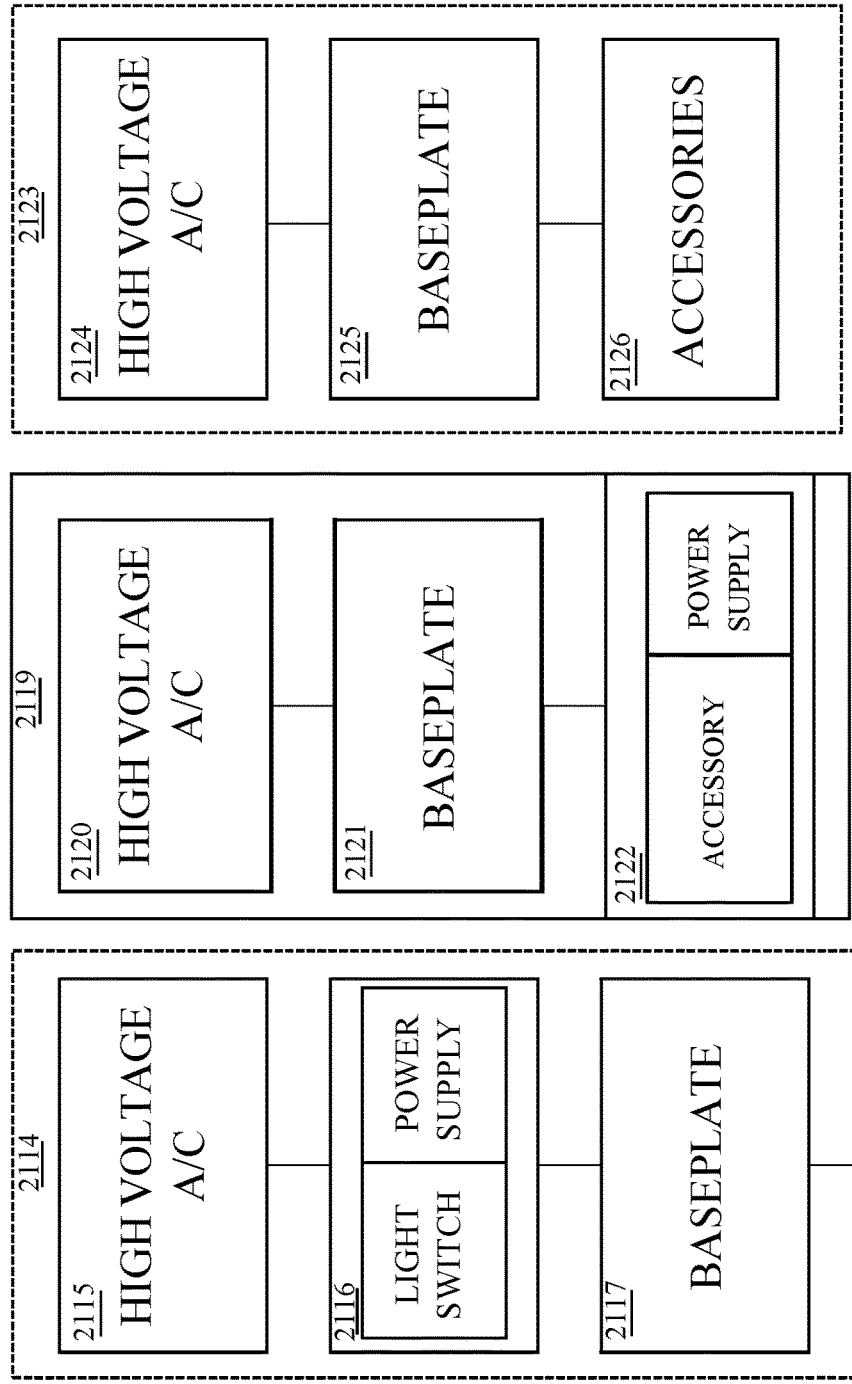

SYSTEM FOR COUPLING ACCESSORIES AND/OR COMPONENTS

CROSS-REFERENCE TO RELATED APPLICATIONS

This application claims priority benefit of U.S. Provisional Patent Application No. 62/668,397, entitled "Modular Adaptation for Light switch or Outlet," filed May 8, 2018, by Christopher Davis, which is incorporated herein by reference.

FIELD

This specification generally relates to a system for powering and/or coupling electronic devices and/or accessories.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Extension cords are used for plugging and powering various devices, which may each have an adaptor that converts wall voltage to a desired form for use by the device.

BRIEF DESCRIPTION

In the following drawings, like reference numbers are used to refer to like elements. Although the following figures depict various examples of the invention, the invention is not limited to the examples depicted in the figures.

FIG. 2A shows a front view of an embodiment of the baseplate, which may be part of the system of FIG. 1A.

FIG. 2B shows a rear perspective view of an embodiment of the same baseplate FIG. 2A.

FIGS. 21A, B, C, D, E, and F depict six different ways for how power can be obtained by one or more attached accessories.

Figure 18B:
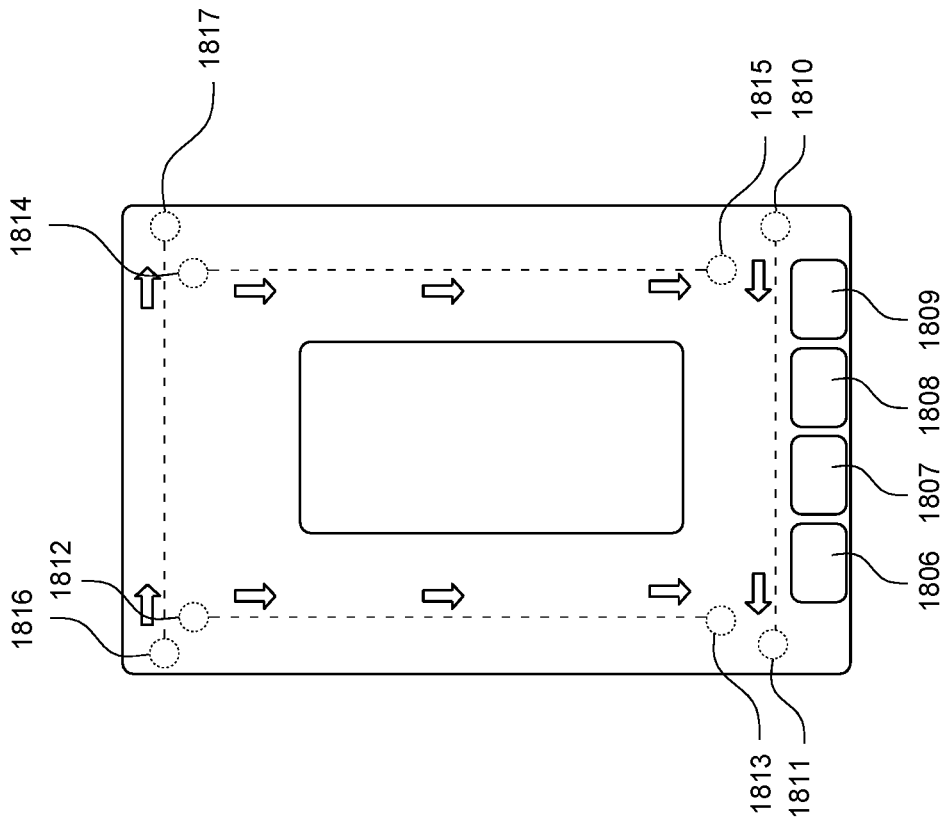
FIG. 18B depicts an embodiment of the front view of a touch cover plate with examples of how touch gestures and buttons can be configured.
Figure 18A:
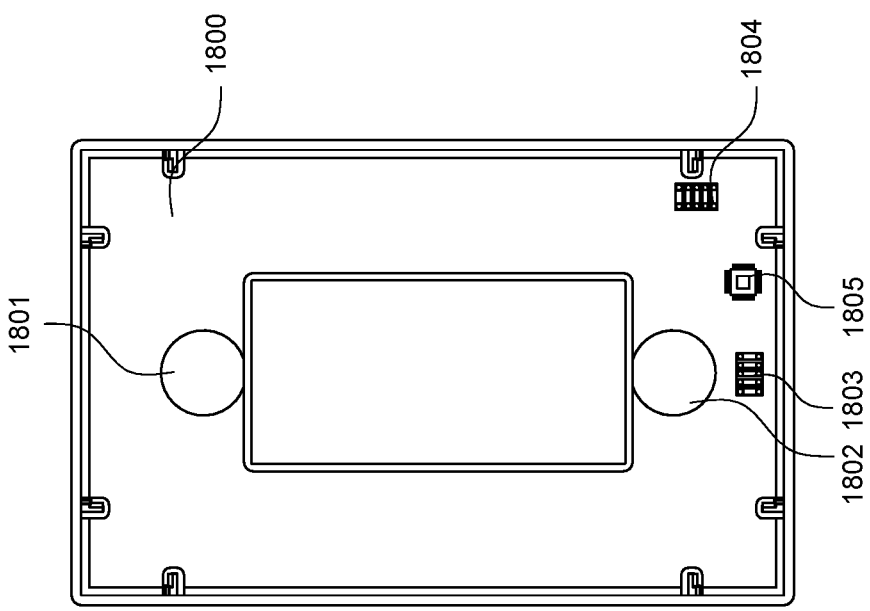
FIG. 18A depicts the rear view of an embodiment of a touch cover plate.
Figure 18C:
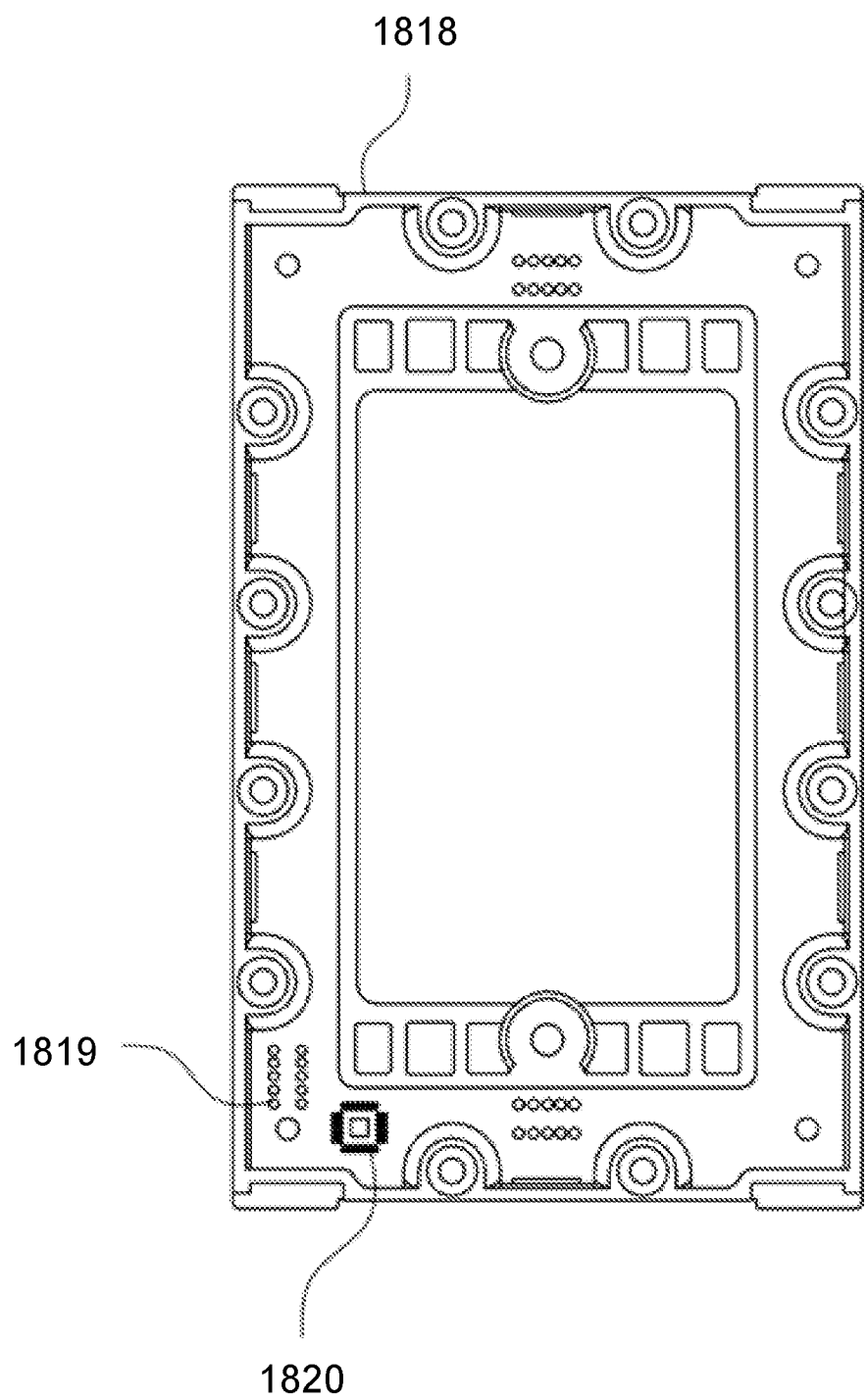
FIG. 18C depicts an embodiment of the front view of a baseplate that includes a chip that may include a processor and/or communications transmitter.
Figure 22:
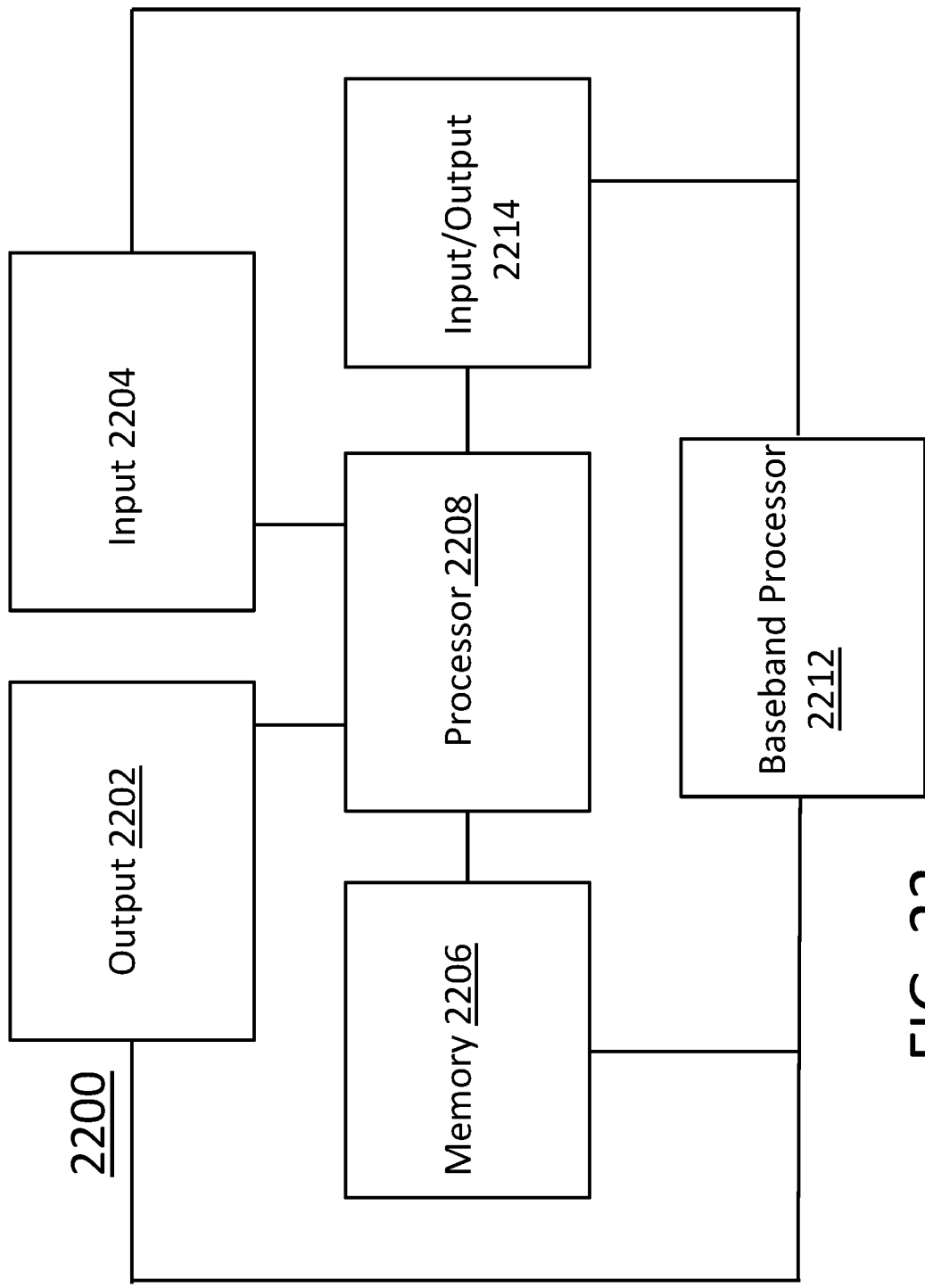

FIG. 22 shows a block diagram of a chip used in FIG. 18C.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Numerous specific details are set forth in order to provide a thorough understanding of the present systems and methods. It is understood that references to number of components and/or gangs whether in schematic representation or text descriptions are presented only as an example reference and that actual embodiments of the invention may be configured for any number of gangs ranging from 1 to infinity. For this reason, several of the drawings and descriptions may vary in size and number of gangs depicted. A gang refers to a set of switches, sockets, or other electrical or mechanical devices grouped together.

Figure 1B:
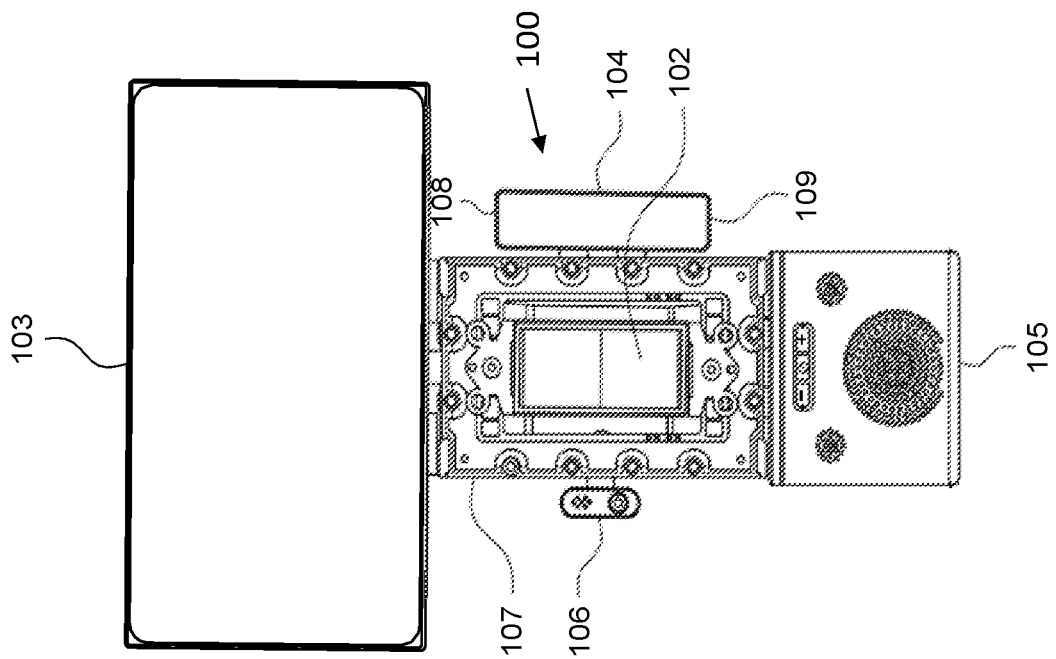
FIG. 1B shows a front view of an embodiment of the same panel of FIG. 1A, but with the cover plate of the modular faceplate system removed, revealing the baseplate.
Figure 1A:
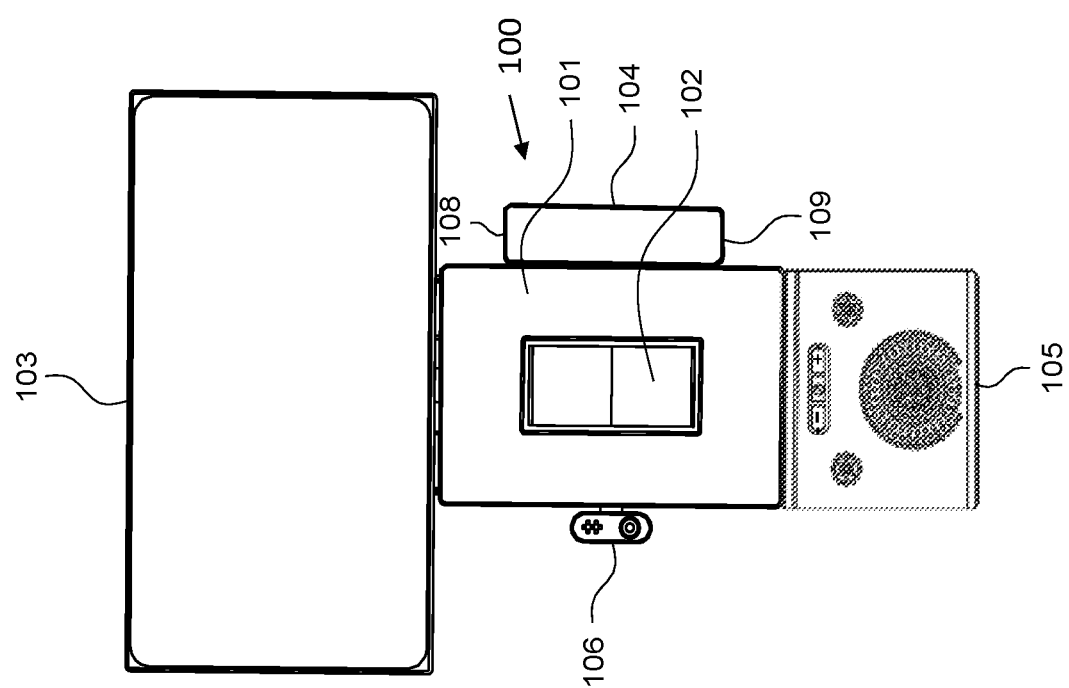
FIG. 1A shows the front view of an example of a panel.

FIG. 1A shows the front view of an example of system 100. System 100 is mounted in a location, such as with a gang or other opening in a wall, which optionally may have been intended for a light switch or an outlet. The opening in the wall is in the vicinity of one or more electrical cables in the wall and/or an electrical junction box. Alternatively or additionally, system 100 may be located on another structure and/or near another type of power source. In this specification, the terms junction box, electric box, electrical component, and any other structure that may be in the vicinity of a power source may be substituted for one another to obtain different embodiments. In this specification the terms outlet and electrical receptacle are used interchangeably and the two terms may be substituted one for the other to obtain different embodiments (the term electric component is generic to both the term outlet and the term electrical receptacle (as well as other electrical components)).

System 100 may adapt (e.g., modify) an opening in the wall for a light switch or outlet for other purposes of use. In the embodiment of FIG. 1A, system 100 has a single gang modular baseplate and has a cover plate attached. In the embodiment of FIG. 1A, cover plate 101 is fully assembled onto the baseplate with an embodiment of a decorator style light switch 102 also installed. In this specification, the term light switch and light switch receptacle are used interchangeably and either may be substituted for the other wherever either occurs to obtain different embodiments. Similarly, in this specification, the terms outlet, electric receptacle, and outlet receptacle are used interchangeably and any may be substituted for the other wherever any occurs to obtain different embodiments. In addition, anywhere in the specification where an outlet, light switch or another electric component is disclosed, any of said outlet, light switch, or another electric component may be substituted for the other to obtain different embodiments. While a decorator light switch is depicted, any type of style and design may be used including but not limited to: Toggle switches, Duplex outlets, Rocker switches, decorator switches, decorator outlets, Ground Fault Circuit Interrupter (GFCI), dimmers, Rotary switches, any electrical outlet style, and/or any light switch style. While a single gang embodiment is shown in FIG. 1A, any number of styles and gang variations may be used. System 100 may also include one or more accessories, such as accessories 103, 104, 105, and/or 106, which may modularly attach to system 100 and may be removable from system 100. Although many examples of accessories are discussed in this specification, none of the accessories is required—each of the specific accessories discussed are optional.

FIG. 1B shows the same front view of an embodiment of system 100 as FIG. 1A, but with the cover plate 101 (FIG. 1A) removed, revealing baseplate 107. In this specification, system 100 may be referred to as a panel, faceplate, the modular faceplate, the faceplate system, or the modular faceplate system, for example. Baseplate 107 may serve as a base component for system 100. Base plate 107 may be referred to as a base or a baseplate of accessories. In this specification, the word baseplate is to be understood as a plate that serves as a base or support for other structures. Baseplate 107 is the base where the modular accessories physically connect and attach. Cover plate 101 (FIG. 1A) hides the baseplate electronics and seals off high voltage electricity and wiring from being exposed. FIG. 1B shows accessories 103, 104, 105, and/or 106 attached to the baseplate 107. The types of accessories that can be installed onto system 100 (which may be a modular faceplate system), and/or attach to the baseplate, is virtually unlimited. As an example, accessory 103 may be a touch screen, which in the example of FIG. 1A, attaches at the top position of the baseplate 107, but may attach to other portions of the system 100, instead. The touch screen device 103 may have many forms of content including video streams, graphical user interfaces, lighting controls and information, home security controls and information, live TV, music control, and many other forms of visual content. As another accessory example, accessory 104 may be a USB charger, which in the example of FIG. 1A is attached at one of the right-side attachment positions of the baseplate 107 (but may be attached elsewhere). The USB charger 104 may have a female (or male) connector located at end 108 and/or at end 109. The connectors at ends 108 and 109 may be used for charging a USB device. For example, end 108 may have a USB TYPE-A connector and end 109 may have a USB TYPE-C connector (or the reverse, end 108 may have a USB TYPE-C connector and end 109 may have a USB TYPE-BA). Both ends 108 and 109 of the USB connection points may be used to charge a variety of devices, including but not limited to, cell phones, tablets, laptops, and any other electronic device that is compatible with USB Type-A or Type C connectors. As another example, accessory 105 may be a speaker, which optionally may be a smart speaker (which optionally may be small) and may include Wi-Fi and/or Bluetooth transceivers, receivers, and/or transmitters, which may be built in. Accessory 105 may be attached at the bottom position of baseplate 107. When installed, the speaker 105 may play music, podcasts, news channels, and many other forms of audio content. As another example, accessory 106 may be a camera (which optionally may be a smart camera) and optionally may include Wi-Fi and/or Bluetooth transceivers, receivers, and/or transmitters. Accessory 106 may include one or more microphones, which may optionally be built in. Optionally, accessory 106 may be attached at one of the left side positions (or to another position) of the baseplate 107 (or elsewhere). While accessories 103, 104, 105, and/or 106 may depict four examples of accessories, and although accessories 103, 104, 105, and/or 106 are shown as being installed at four different attachment points of the baseplate 107, it is nonetheless possible to install and/or attach any number of accessories. For example, different embodiments or configurations may have only three accessories, only two accessories, only one accessory, or no accessories at all. Additionally, it is possible to install any accessory at any attachment point of the baseplate 107. As an example, it is possible to only install the speaker accessory 105 at the bottom position with no other accessories installed on the baseplate 107. As another example, it is possible to only install accessory 106 (e.g., the camera) at the top position and accessory 104 (e.g., the USB charger or connector) at the bottom position. In an embodiment, at any time, it is possible to remove one or more accessories and/or change the location at which one or more accessories are installed. System 100 may include any number of accessories and may include any number of accessories that may protrude from under cover plate 101 on any side of cover plate 101. Any electric component may be an accessory. For example, one of the accessories may be a battery that supplies power to one or more of the other attached accessories and/or electric components, such as in case of a loss of power from the power source.

FIG. 2A shows baseplate 200 (which may be an embodiment of baseplate 107, FIG. 1A) from the front view, which may be part of system 100 (which may be a modular faceplate system). In the embodiment of FIG. 2A, baseplate 200 may be part of system 100, and may be for a single gang modular faceplate system. In an embodiment, removing cover plate 101. (FIG. 1A), reveals baseplate 200 (the cover plate 101 and the power supply are not depicted in FIG. 2A). In this specification, any place an AC to DC power supply is mentioned, another power supply (e.g., an AC-to-AC power supply) may be substituted to obtain other embodiments. Any power supply in this specification may be an AC-to-AC power supply, AC to DC power supply, or other power supply may be substituted to obtain other embodiments. When the cover plate 101 (FIG. 1A) and all accessories and electric components (such as light switches or outlets) are removed from system 100, the remaining component(s) of the system 100 may be referred to as a baseplate (which may include baseplate 107 and/or 200).

Figure 2C:
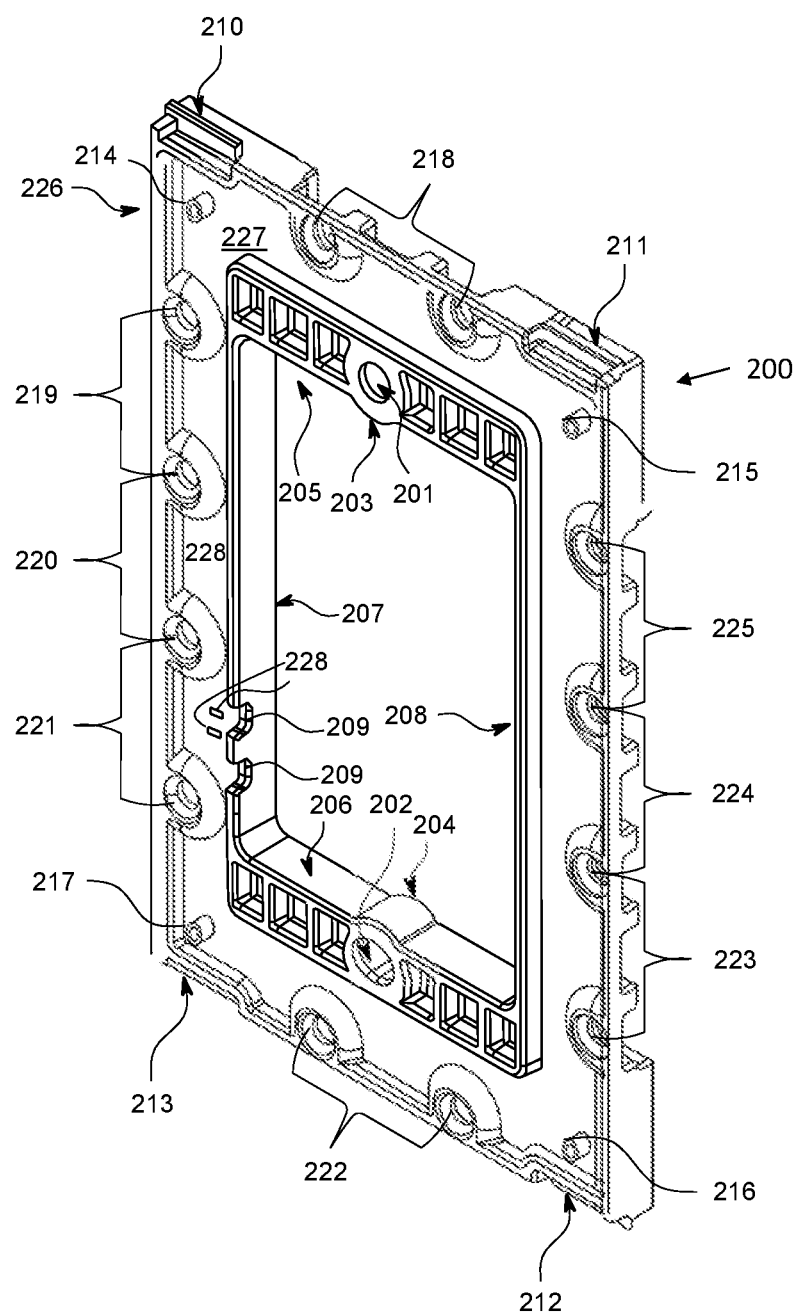
FIG. 2C shows a front angled perspective view of an embodiment of same baseplate as FIG. 2A and FIG. 2B.

FIG. 2B shows an embodiment of the same baseplate 200 (e.g., a single gang baseplate as shown in FIG. 2A), but in the embodiment of FIG. 2B baseplate 200 is depicted from a rear perspective. FIG. 2C shows the same baseplate 200, as FIG. 2A and FIG. 2B, but in FIG. 2C baseplate 200 is depicted from a front angled perspective view. Fastener couplings 201 and 202 (which in the example of FIGS. 2A-2C are screw hole openings) are used during the installation of the baseplate 200 to fasten the baseplate 200 to any electric components desired and fastener couplings 201 and 202 (and/or accessories) may fasten both the electric components and the baseplate to an electrical junction box. The term "electric component" may include the combination of electrical hardware and a housing and/or receptacle that house electrical hardware inside. The terms electric component and electrical component are used interchangeably. Examples of electric components include light switches, other switches, outlets, touch screens, controllers, and/or other electric components. The term electric component is also to be understood as being generic to accessories that include electrical hardware and generic to the cover plate (in embodiments in which the cover plate has electrical hardware), for example. The terms "screw hole" and "screwhole" are used interchangeably. Ordinarily, "screw-hole" is used instead of "screw hole" when it is believed that the readability is improved. In this specification, in any place a screw, screw hole, or other structure related to a screw is mentioned, another fastener may be substituted to obtain another embodiment. For example, a nail, rivet, bolt, peg, or staple, spring may be substituted for any screw to obtain another embodiment. In this specification, any place a screw hole, or other structure related to a screw is mentioned, a receiving area, such as a hole and/or receiving area for nail, rivet, bolt, peg, spring, or staple may be substituted to obtain another embodiment. In this specification, any place a structure related to a screw is mentioned, a corresponding structure of a fastener, such as for nail, rivet, bolt, peg, spring, or staple, may be substituted to obtain another embodiment. If a screw is used, the screw may be a wood screw or a screw that screws into a threaded hole or nut. The electric components may have fastener couplings (e.g., screw-hole openings). The fastener couplings may align with fastener couplings 201 and 202, so that the fastener couplings 201 and 202 may be aligned with the fastener couplings of the electric component. The alignment of fastener couplings 201 and 202 may be configured to facilitate fastening the baseplate 200 to the electric component and to a wall, other structure, and/or optionally to the junction box. For example, if fastener coupling 201 and 202 and the fastener couplings of the component are screw holes, the screw holes of the baseplate 200 and the component may be aligned. A single screw may be placed in each of the one or more pairs of aligned screw holes (having one screw hole from baseplate 200 and one screw hole from the component). Fastener coupling 201 and 202 (and their corresponding fastener couplings) may be used to fasten both the electric component and the baseplate at the same time to the wall, a junction box, and/or other structure. In the embodiment of FIG. 2A, fastener coupling 202 has a slightly wider screw hole opening (or other opening that a fastener may engage with) than fastener coupling 201. In an embodiment, one screw hole opening may optionally be wider than the other. Having one of the screw-hole openings of fastener couplings 201 and 202 wider than the other allows the angle at which baseplate 200 and/or any attached electric components to be adjusted, so as to be level even if the junction box (or other structure) is uneven or not level. For example, where fastener couplings 201 and 202 screw holes of the same size, the user may install the baseplate 200 and any attached components and find that the appearance is not perfectly level or to their and the orientation may be difficult to correct. Having one or both of the screw hole openings of fastener couplings 201 and 202 wider than the other, allows the user to adjust the angle of the baseplate and attached component to the user's liking. Protrusions 203 and 204 may increase around the area of the fastener couplings 202 and 201, so that in an embodiment in which fastener couplings 202 and 201 are holes, the head of the fastener (which may be the head of a screw) contacts the protrusion and optionally compresses the protrusion slightly. The slight compression of the protrusion creates extra rigidity around the fastener couplings 202 and 201. Optionally, fasteners 202 and 201, and may closely resemble the screw hole openings found on an electrical box.

In an embodiment, regions 205 and 206 are regions that may include spacers. Optionally regions 205 and 206 have an area that optionally spans the edges of the baseplate 200. Optionally, regions 205 and 206 may span the top, bottom, right side and/or left side edges (and/or have other locations). For example, regions 205 and 206 may include a series of one or more protrusions, which may optionally include depressions between the protrusions, for example, which optionally may form a ribbed pattern. In an embodiment, the depressions in the regions 205 and 206 create the deepest points of the baseplate 200. In an embodiment, flanges of an electric component, such as a light switch, may rest on regions 205 and 206. Regions 205 and 206 lift the electric component away from the wall or other structure to which system 100 is attached, so as to create a gap via which accessories may be connected to baseplate 200. Spacers (in addition to or instead of regions 205 and 206) may be located on any surface that creates that gap, such as the wall, junction box, electric component, and/or cover plate 101. Also, optionally any surface opposing a spacer may be flat for the spacer to rest on, may also have spacers, and/or may have depressions for spacers to rest in. For example, alternatively or additionally, flanges of the electric component may have depressions which may rest on protrusions of regions 205 and 206. Alternatively, or additionally, one or more of the flanges may be on the baseplate 200 and/or one or more of the regions 205 and 206 may be located on an embodiment of an electric component that may have regions 205 and 206. In an embodiment, the flanges and spacers engage one another for added stability. For example, the protrusions and/or depressions of the spacers may interlock and/or fit into the depressions and/or protrusions of the flange, respectively. In an embodiment, the flanges may have spacers in addition to or instead of regions 205 and 206, (whether the flanges are on the electric component or baseplate 200). In an embodiment, as a result of the protrusions (e.g., surrounding the depressions), regions 205 and 206 effectively act as spacer elements, which create additional depth from the flanges of the electric component and the wall. The protrusions effectively move the electric components further away from the wall than without (or than would be possible than without) the regions 205 and 206 on baseplate 200. In addition, in an embodiment, the regions 205 and 206 hover over the wall cut out for the electrical box (or other structure), and because the regions 205 and 206 hover over the wall cut out for the electrical box, the extra depth of spacers 206 and 205 offer increased rigidity for the entire baseplate 200. The ribbed protrusions depicted in regions 205 and 206 may also aid in heat dissipation for the electrical components and may aid in better manufacturing performance with injection molding. While ribbed protrusions are depicted in regions 205 and 206, the ribbed protrusions are not required. The ribbed protrusions may also take many other design forms.

In an embodiment, fireguards 207 and 208 may be walls (or lips or guards) that surround the region where the power source is located. Optionally, fireguards 207 and 208 may span the entire inside cut out edge of the baseplate and match the depth created by regions 205 and 206, in order to provide increased support for electric component flanges. Additionally, fireguards 207 and 208 may have a higher depth than the exterior edges 226 of the baseplate 200. Because of fireguards 207 and 208, when the cover plate is attached to the baseplate 200, the combination of regions 205 and 206, and/or fireguards 207 and 208 create a wall structure that protects against fire. The wall structure that protects against fire (created by the combination of regions 205 and 206, and/or fireguards 207 and 208) keeps electrical arcs (e.g., from high voltage Alternating Current (AC) wires) from escaping the electric junction box inside of the wall and keeps sparks from escaping the electric junction box inside of the wall. Additionally, the firewall like structure formed by fireguards 207 and 208 and/or regions 205 and 206 also keep high voltage AC wires and potential electric arcs and sparks firewalled away from the Printed Circuit Board (PCB) and Direct Current (DC) power components and any attached accessories. Optionally, fireguards 207 and 208 may be spacers and/or regions 205 and 206 may be replaced with just fireguards. Although in many of the embodiments throughout this specification, one or more PCBs may be used, the PCBs are optional. Free-floating insulated wires may be used instead of PCBs. Optionally, the wires may be secured to another board instead of (or in addition to) having wires printed on a board or secured to the baseplate (or other structures, such as a cover plate) directly. Optionally, the wires may be printed directly onto the baseplate 200, without usage of a second board, such as a PCB or other board.

Cutouts 209 may include one or more cutouts from fireguard 207 and/or 208, and/or regions 205 and/or 206, which may allow wires and/or connectors to cross fireguard 207 and/or 208, and/or regions 205 and/or 206 and attach to components on the baseplate 200. For example, the wires may connect to the PCB traces 228 found on the PCB 227 (FIG. 2C) of the baseplate 200.

Cover plate fasteners 210, 211, 212 and/or 213 fasten the cover plate to baseplate 200. Cover plate fasteners 210, 211, 212 and/or 213 optionally may be protrusions that are optionally extended in length, which may be used to align and/or attach the cover plate 101 to baseplate 200 in order to firmly attach and secure the cover plate to the baseplate 200. Cover plate fasteners 210, 211, 212, and/or 213 may optionally press against inner walls of the cover plate 101. Cover plate fasteners 210, 211, 212, and/or 213 may engage detents, clips, and/or depressions on the cover plate and optionally baseplate 200 may snap to the cover plate and/or form a friction fit holding the cover plate to the baseplate 200. In other embodiments, cover plate fasteners 210, 211, 212, and/or 213 may be located in other locations and/or have different shapes.

Circuit support fasteners 214, 215, 216, and/or 217 fasten a circuit support to baseplate 200. Circuit support fasteners 214, 215, 216, and/or 217 may be circular protrusions, which may be used in order to fit the PCB 227 firmly into place onto the baseplate 200. Circuit support fasteners 214, 215, 216, and/or 217 may be hot stamped and/or glued into place to further secure the PCB 227 firmly into place on baseplate 200.

The embodiments of baseplate 200 depicted in FIG. 2A, FIG. 2B, and FIG. 2C, may include accessory attachment points 218, 219, 220, 221, 222, 223, 224, and/or 225 and may be used for attaching accessories, such as 103, 104, 105, and/or 106. In an embodiment, attachment point 218 may be located at the top of baseplate 200, attachment points 219, 220, and/or 221 may be located on the right side of baseplate 200. Attachment point 222 may be located at the bottom of baseplate 200. Attachment point 223, 224, and/or 225 may be located at positions on the left of baseplate 200. While eight accessory attachment points are depicted in FIGS. 2A-C, any number of accessory attachment points may be present (and may be varied). For example, two gang, three gang, four gang and other gang styles of system 100 and baseplates may contain additional accessory attachment points. Likewise, as an additional example, single gang, two gang, three gang, four gang, or any number of gangs and/or other style of system 100 and baseplate may contain less than 8 accessory attachment points. In an embodiment, each of accessory attachment points 218, 219, 220, 221, 222, 223, 224, and/or 225 has two circular openings depicted which represent the area where optionally two independent screws can be installed to support the installed accessory firmly in place. For example, each of attachment points 218, 219, 220, 221, 222, 223, 224, and/or 225 may include a raised surface surrounding a hole and/or opening. For example, if a speaker accessory is attached at the attachment position 222, there may be a screw fastened at each of the two screw holes openings to secure the speaker accessory firmly into place. A purposeful, functional, and design element of system 100 is that the spacing between each screw hole opening at the attachment points is the same. In an embodiment, the spacing between each screw hole allows attachment points to share the same screw-hole openings from other attachment points whenever three or more screw-hole openings are present together. For example, notice that attachment point 224 shares one of the screw-hole openings from both the 225 and 223 attachment points. Likewise, attachment point 220 shares one of the screw-hole openings from both the 221 and 219 attachment points. The front side of every attachment point, as depicted in FIG. 2A and FIG. 2C, have a raised protrusion surrounding the screw hole opening which serves as extra depth for threading the screw into the attachment point screw hole opening. In an embodiment, adjacent attachment points do not necessarily share a connection hole (and optionally no connection points share a hole). In another embodiment, attachments may include attachment points that have fewer than or more than two holes. The holes of the attachment point may be screw holes. In another embodiment, attachment points may include other types of couplings other than holes, such as posts, clasps, snaps, clips, springs, and/or buttons, for example.

Optionally, the backside of the baseplate has cutouts (or depressions) under each, and surrounding each of the screw hole openings (or other fasteners), which optionally match the mating protrusions of the accessory being attached. In the embodiment of FIG. 2B, cutouts are located in each of attachment points 218, 219, 220, 221, 222, 223, 224, and/or 225 in FIG. 2B and on the top and side of attachment points 218, 223, 224, and 225, as can also be seen in the perspective view of FIG. 2C.

The cutouts of attachment points 218, 219, 220, 221, 222, 223, 224 cut away varying amounts of the structure of baseplate 200 in order to make room for the accessory attachment.

On the backside and center of each attachment point of the baseplate 200, there are sections 229, 230, 231, 232, 233, 234, 235, and 236 (see FIG. 2B) that are completely removed in order to expose sections of the PCB 227 (FIG. 2C) that is installed on the front side of the baseplate 200. Sections 229, 230, 231, 232, 233, 234, 235, and 236 may be small rectangular sections, via which traces or connectors of the PCB may be exposed. Furthermore, the PCB 227 is further exposed via a recess located further in from the small rectangular sections. The exposed PCB traces located at each accessory attachment point can be used to transfer power and/or data signals from the baseplate PCB to and from attached accessories 103, 104, 105, and/or 106, to other attached accessories and/or to the power supply and/or electric components that are attached onto the baseplate 200. Although in some examples discussed in this specification data is transferred electronically, in other embodiments data may be transferred optically (e.g., by fiber optic cables), sonically, and/or by radio waves. Any place that data transfer it mentioned (e.g., for indicating the maximum current of an accessory or for communications between accessories and/or between the accessories and power requirement detector), the data transfer may be performed optically (e.g., by fiber optic cables), sonically, and/or by radio waves. The baseplate 200 (and any corresponding cover plate 101) may be installed in the orientation depicted or can be turned 180 degrees so that the bottom attachment point 222 becomes the top attachment point instead of attachment point 218. Likewise, baseplate 200 (and any corresponding cover plate 101) may be installed onto electrical boxes that are rotated in any direction. It is only necessary to have fastener couplings 201 and 202 align with the electrical box found inside of the wall.

Figure 3:
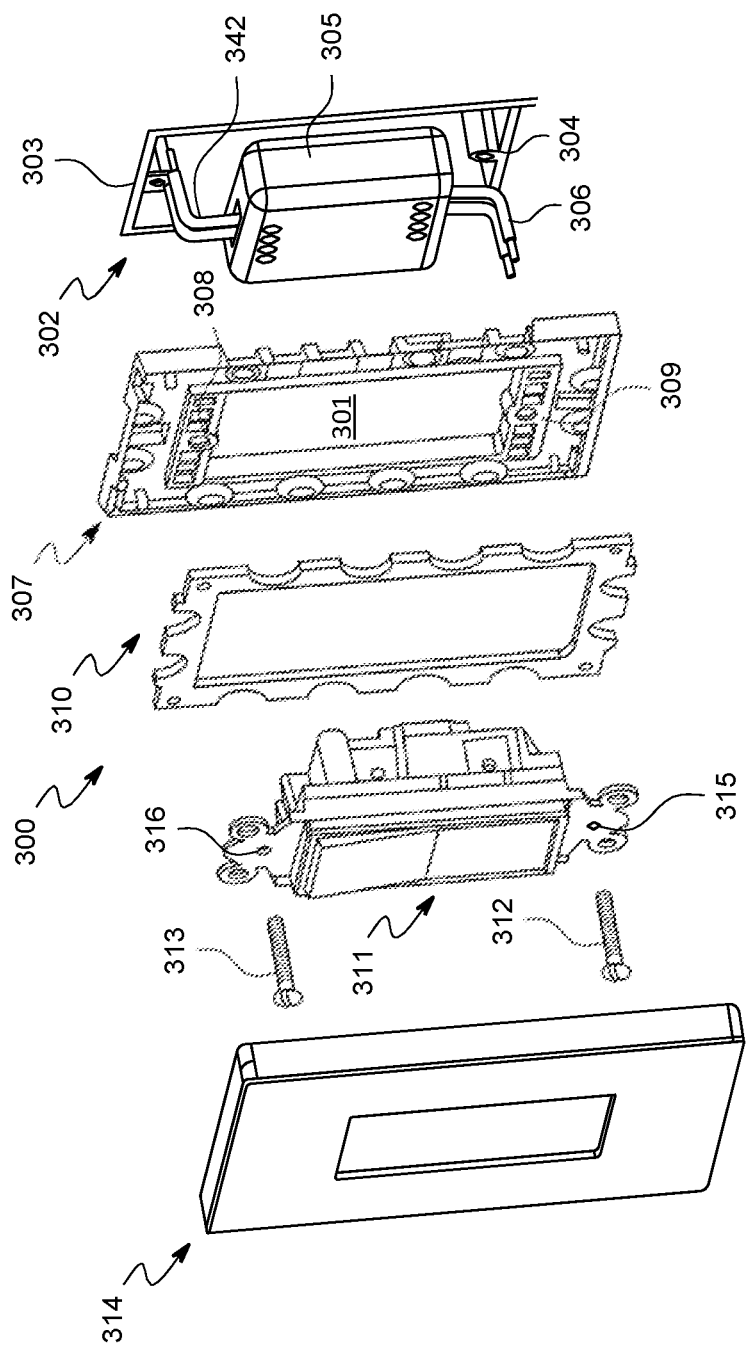
FIG. 3 depicts a side perspective exploded view of an example of a single gang embodiment of the panel of FIGS. 1A-2C.

FIG. 3 depicts a single gang modular embodiment 300 (of system 100 in an exploded state from a side perspective view.

Opening 301 may be an opening designed for a single gang light switch installation. Electrical box 302 may be located inside of the wall. Screw-hole 303 is the top screw hole of the electrical box while bottom screw hole 304 is the bottom screw hole opening of the electrical box.

Electrical box 302 may be a junction box, which may include screw hole openings 303 and 304 and may be located inside of the walls of buildings (or other structure) wherever an electric receptacle or electrical junction is present. Power supply 305 may include an AC to DC power converter that can be used as a method for supplying DC current to the baseplate 307 and may reside inside of the electrical box 302 when installed. High voltage AC input wires 342 may be located inside of electrical box 302. High voltage AC wires 342 found inside of the wall and electrical junction box can be split using a wire nut in order to supply an additional pair of wires for the input of the AC power supply. In an embodiment, any electric wiring configuration may be unaffected by system 100 and may be installed in a manner compatible with preexisting high voltage AC wires. Output DC wires 306 carry electricity from power supply 305. In an embodiment, output DC wires 306 may include data communication wires. The output DC wires 306 may connect directly to board 310. DC power from the output of the AC to DC power supply may then be distributed by the baseplate PCB to the accessory attachment points. Data wires, when present from the power supply 305, can be used to communicate, through the PCB 310, the available power for the attached accessories to use. The data wires from the power supply can also be used to determine if another power source is present. The use of the data wires from the power supply is virtually unlimited and the above embodiments are simply examples. Baseplate 307 may be part of system 100 (of FIGS. 1A-3) without the PCB 310, cover plate 314 or any accessories attached. Baseplate 307 component may be referred to as the base, because baseplate 307 serves as the base for the PCB 310, electrical component 311, cover plate 314, and serves as the base component that accessories attach to (not depicted here). Baseplate 307 may be an embodiment of baseplate 200 (of FIGS. 2A-2C). Board 310 may be the PCB component of system 100 and/or may be PCB 227. Board 310 component is designed to be part of the baseplate 307 and may facilitate distributing the DC power to each of the accessory attachment points, via electrical conductors which may be exposed power line traces printed onto board 310. Additionally, board 310 may include conductors (which may be printed onto board 310, e.g., as data traces) that can be used for transmitting power and/or data communication between the AC-to-DC power supply 305, any attached accessories, component 311, any light switches present on the baseplate, and/or any other attached electrical components on the baseplate 307. In other words, the board 310 serves as a power distribution relay and data communication relay, which distributes and/or relays power and/or data, between power supply 305 and any component that makes purposeful contact with board 310. The shape of the board 310 is designed to fit the size and design (e.g., the shape) and the attachment points of the configured baseplate 307. While a single gang baseplate with 8 attachment points and corresponding board 310 is depicted in FIG. 3 as baseplate 307, the shape of board 310 may change according to the number of attachment points and/or the size of the baseplate 307 and/or number of gangs on the baseplate 307. In other embodiments, board 310 may have a built-in processor, wireless communication module, memory, power supply and/or other electronic device and/or components built-in. Having other components built-in into board 310, allows board 310 to share, distribute, and/or relay functions of the built-in components to other accessories and/or electrical components that are attached to board 310.

Component 311 may be an electric light switch, which may be in the decorator style. Likewise, while a decorator light switch component is depicted here, component 311 may be any electric component or any light switch with any design (or optionally there may be no electric component or light switch at all). Fasteners 312 and 313 may be used to install the component 311 onto the baseplate 307 and into the electrical box 302. If fasteners 312 and 313 are screws, fasteners 312 and 313 may fit in and/or screw into the screw-hole openings labeled 304 and 303. Plate 314 may be a cover plate. When installed, plate 314 may attach firmly onto the baseplate 307. Although plate 314 depicted here is in the style of decorator style, so that plate 314 fits around a decorator style light switch (which is an example of component 311), another style may be used instead. The cover plate opening can be in any style or shape desired, including, but not limited to, decorator style, duplex style, toggle switch style, any custom design style or have no component or light switch opening at all. Plate 314 is designed in such a way that the plate 314 does not contact the wall when fully installed, so as to not interfere with the attachment of accessories that may be installed onto baseplate 307. When fully installed, the plate 314 may appear as though it is floating slightly away from the wall (because plate 314 does not touch the wall). When the system 100 is fully assembled and installed with no accessories attached to plate 314, the appearance may resemble a traditional faceplate (except that plate 314 may appear to float off the wall).

An embodiment of the installation steps for the system 100 depicted in FIG. 3 may be as follows: First, the breaker relating to the desired installation location may be turned off. The installer may proceed to connect the AC wires to the input side of the AC to DC power supply 305, via a wire nut, another fastener, or by any means that allows the AC wires to contact the relevant AC input wires of the power supply in a safe manner. Next, the installer may attach the DC output wires and any data communication wires (that may be present) (which may come from the power supply) to the board 310 at a designated connection point. The installer may then place the AC to DC power supply 305 into the electrical box 302 and tuck the wires inside of the electrical box 302. Next, the installer may align the electrical component 311 (if present) and align the screw-hole openings found on the top and bottom of the flanges 315 and 316 of component 311 and align them with the screw hole openings 309 and 308, respectively, found on the baseplate 307. Next, the baseplate 307 (which has the board 310 attached to it) and any corresponding electrical components and/or light switches may be aligned, so that the screw hole openings 308 and 309 of the baseplate 307 may be aligned with the screw hole openings 303 and 304 of the electrical box 302. Also, any screw hole openings on flanges 315 and 316 of component 311 may be aligned with the screw hole openings 303 and 304 of the electrical box 302. Once aligned, the top screw 313 may be inserted through any of the screw-hole openings of flange 316 present on the top flange of component 311 and through the screw hole opening 308 on the top of baseplate 307 and screwed into the screw hole opening 303 on the top of the electrical box 302. Next, the bottom screw 312 can be inserted through any screw-hole openings of flange 315 that are present on the bottom flange of component 311 (e.g., a light switch) and through the opening of screw-hole 309 at the bottom baseplate 307 and screwed into the screw-hole opening 304 at the bottom of electrical box 302. At this point, any accessories desired to be attached to the baseplate 307, may be installed onto any of the attachment positions of the baseplate 307. The installer may choose to not attach any accessories at all, as depicted by the absence of any accessories in FIG. 3. Finally, the cover plate 314 may be firmly pressed into place by pressing the cover plate firmly over the four corners of baseplate 307 until an audible clicking is heard from each of the four corners, for example. In an embodiment, an audible clicking may be used to indicate that the cover plate is grabbing and/or engaging the attachment points and being secured in place.

Figure 4A:
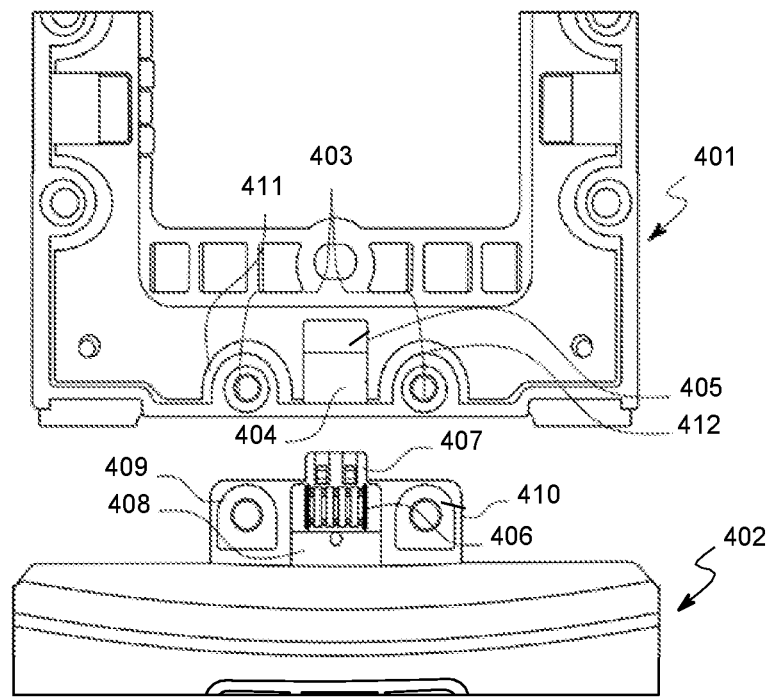
FIG. 4A shows a front view of an embodiment of a single gang system of FIG. 1A with the PCB and cover plate removed and with a speaker accessory not yet attached to the bottom position of the modular faceplate system.
Figure 4B:
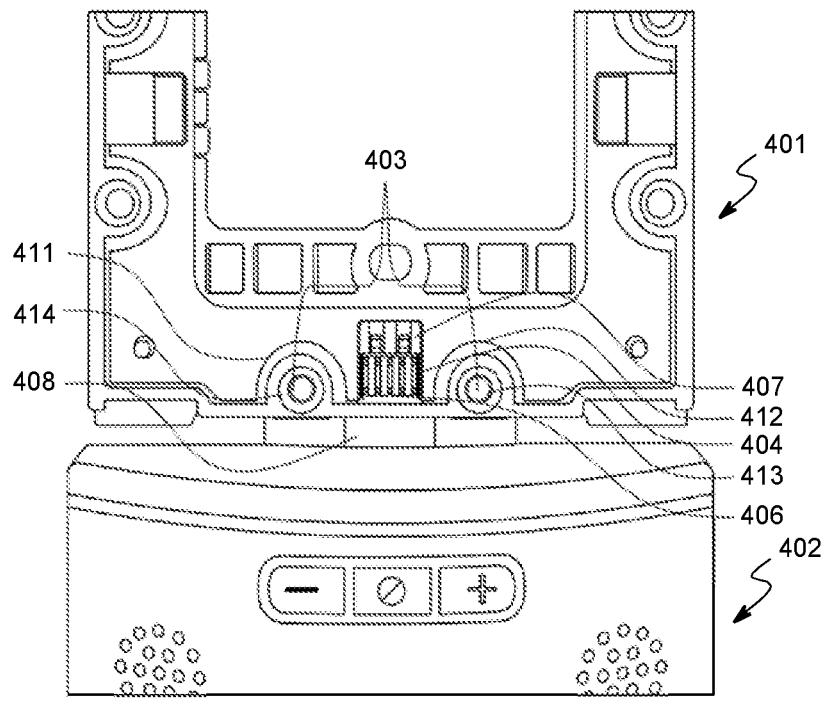
FIG. 4B shows an embodiment of the same single gang system as FIG. 4A, except that in FIG. 4B the speaker accessory is attached.
Figure 4C:
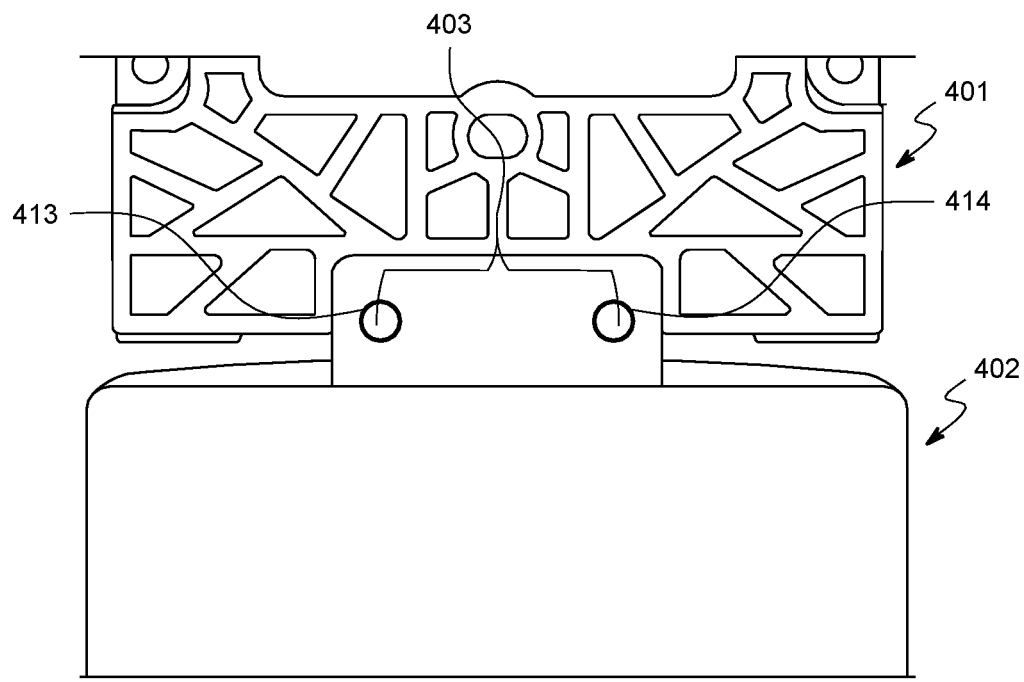
FIG. 4C depicts a rear perspective view of an embodiment of the same features as FIG. 4B.
Figure 4D:
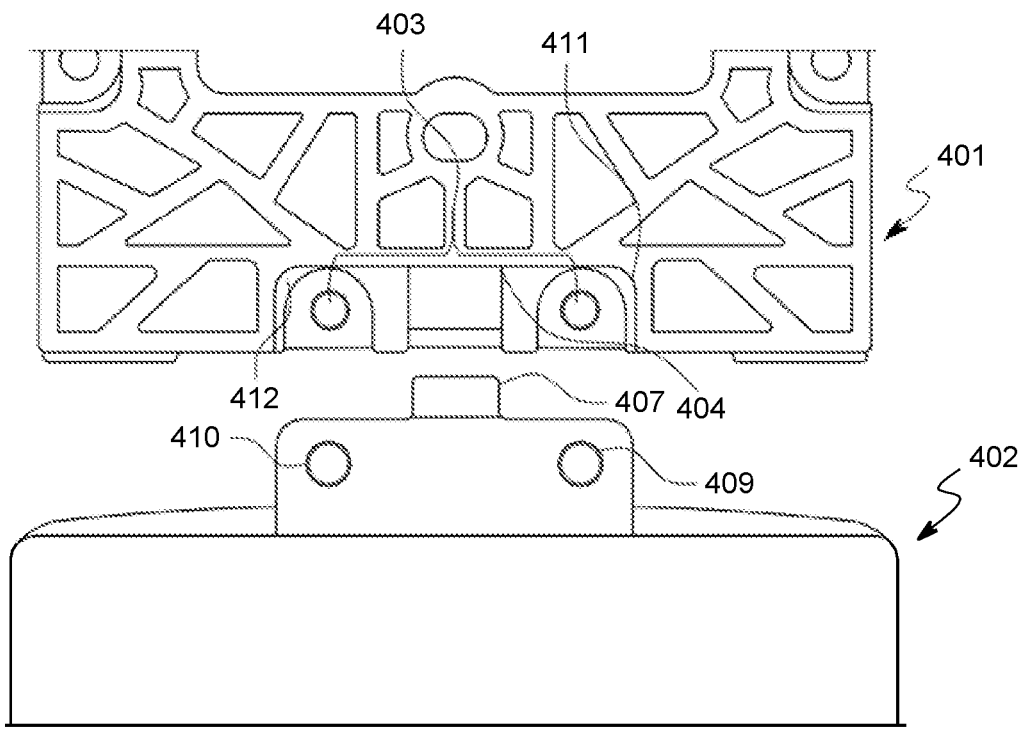
FIG. 4D shows a rear perspective view of the same system as FIG. 4A with the same speaker accessory not yet attached to the bottom position of the modular faceplate system.

FIG. 4A shows a single gang system 401 from a zoomed in front view with the PCB (which may connect to PCB 227 or board 310) and cover plate removed and with a speaker accessory 402 not yet attached to the bottom position 403 of system 401 (which may be included in an embodiment of system 100). System 401 may be a baseplate. FIG. 4B shows the same system 401 as FIG. 4A, except that in the embodiment of FIG. 4B the speaker accessory is attached. Likewise, FIG. 4D shows an embodiment of the same single gang system 401 with an embodiment of the same speaker accessory 402 not yet attached to the bottom position 403 of system 401, but the view is depicted from the rear perspective. Likewise, FIG. 4C depicts the same features as FIG.

4B, but from a rear-view perspective. FIG. 4D depicts the same features of FIG. 4A, but from a rear-view perspective. Note that the baseplate of system 401 and accessories in 4A, 4B, 4C, and 4D show only specific areas related to the aforementioned description. When the baseplate of the system 401 is shown without the cover plate, it can be referred to as the baseplate (or base) of system 401. Cutout 404 may be rectangular shaped (or another shape) and may be a full cut out from the bottom attachment position of the baseplate. A smaller optionally rectangular recess 405 may be present slightly above the full cutout 404. In an embodiment, the combination of cutout 404 and recess 405 allow for contact from an attachment point 408 (which may include PCB) of accessory 402, to be exposed to the PCB of the system 401. In an embodiment, the outline of the accessory attachment point 408 includes two distinct sets of contacts 407 and 406. Contacts 407 are a pair of contacts on the accessory attachment point 408 (which may include PCB), which are used for the transfer of DC current from the PCB (or other structure on which wiring is attached) of the system 401 in order to power the electronic components present inside of the speaker accessory 402. Contact 406 depict several contact points on the accessory attachment point PCB 408 which can be used for any form of electronic communication when it fully contacts the corresponding traces (or other electrical conductors) on the PCB. While many contact points are depicted as contacts 406, any number of contact points may be present, or no contact points may be present at all. Likewise, although two contact points are present in contacts 407 of the embodiment of FIG. 4, any number of contact points may be present, or no contact points may be present at all. When the accessory 402 is fully installed onto the system 401, the contact points of the accessory PCB attachment points shown in contacts 406 and 407 may be exposed in the cutout area 404 and recess area 405 of the system 401. Protrusions 409 and 410 may be raised protrusions on the connection points (of the speaker accessory) with a circular cutout in each protrusion 409 and 410, which is designed for secure installation when screws are used to attach the accessory onto the baseplate. In an embodiment, protrusions 409 and 410 and the circular cutouts within protrusions 409 and 410 mate exactly with the protrusions 411 and 412 of the baseplate of system 401. Together protrusions 409 and 410 can securely be installed into the protrusions of 411 and 412. When an accessory is fully inserted into an attachment position of the system 401 (such as when accessory 402 is installed onto the bottom attachment point 403 of system 401) screw hole openings 413 and 414 can be used to fasten the attached accessory firmly into place. While the bottom attachment point 403 of the baseplate is shown with a speaker accessory 402 installed, any type of accessory may be installed onto any of the available attachment positions of the baseplate.

Figure 5:
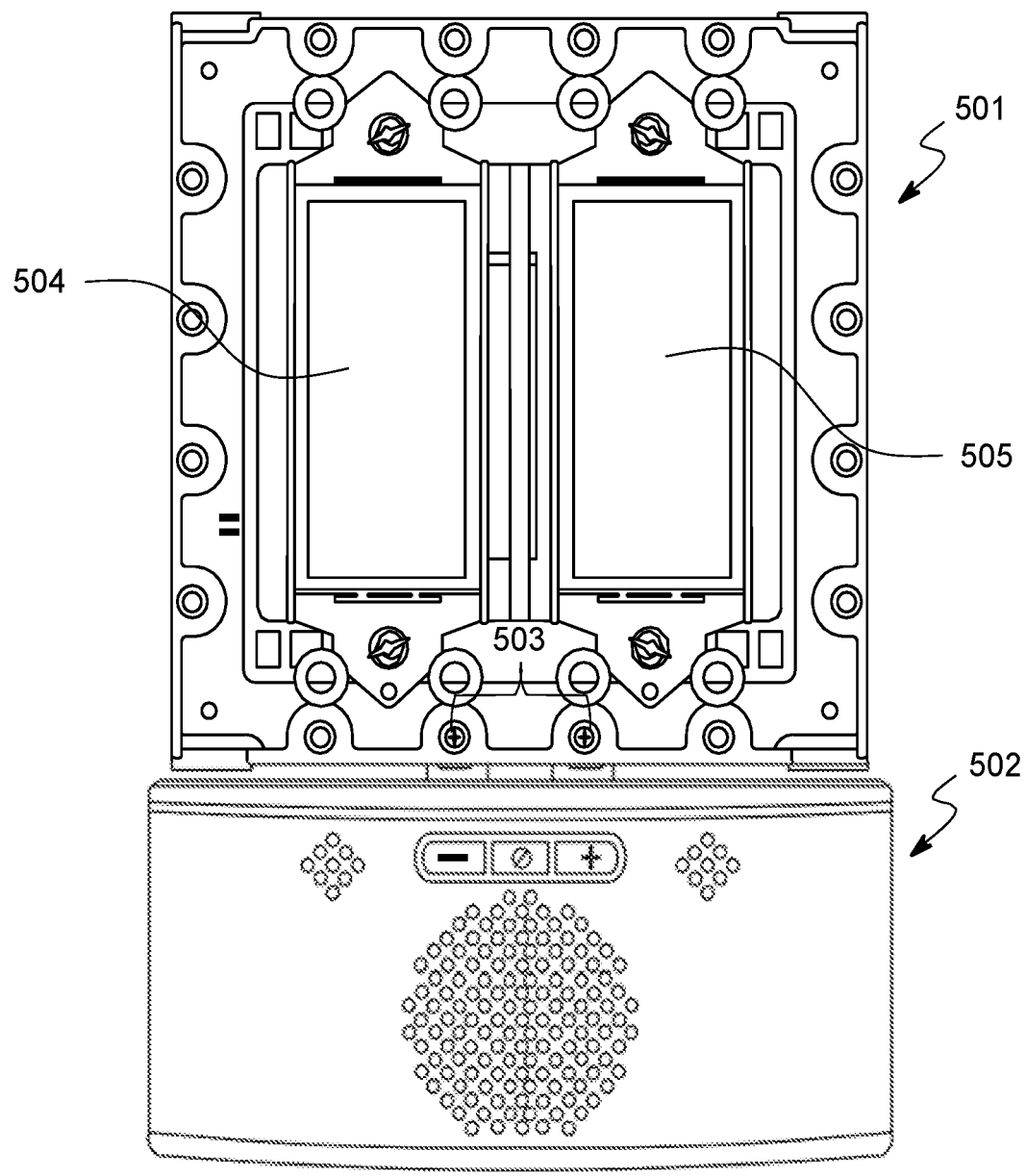
FIG. 5 shows an example of a dual gang baseplate with a speaker accessory attached at the bottom and with no cover plate attached on the baseplate.

FIG. 5 shows an example of a dual gang system 501 (which may be included in an embodiment of system 100). When the cover plate is not attached to the base of the modular faceplate system, the base may also be referred to as the baseplate. Smart speaker 502 may be attached at one of the bottom mount point positions 503 of the baseplate. Two light switches 504 and 505 are installed onto the baseplate of dual gang system 501.

Figure 6:
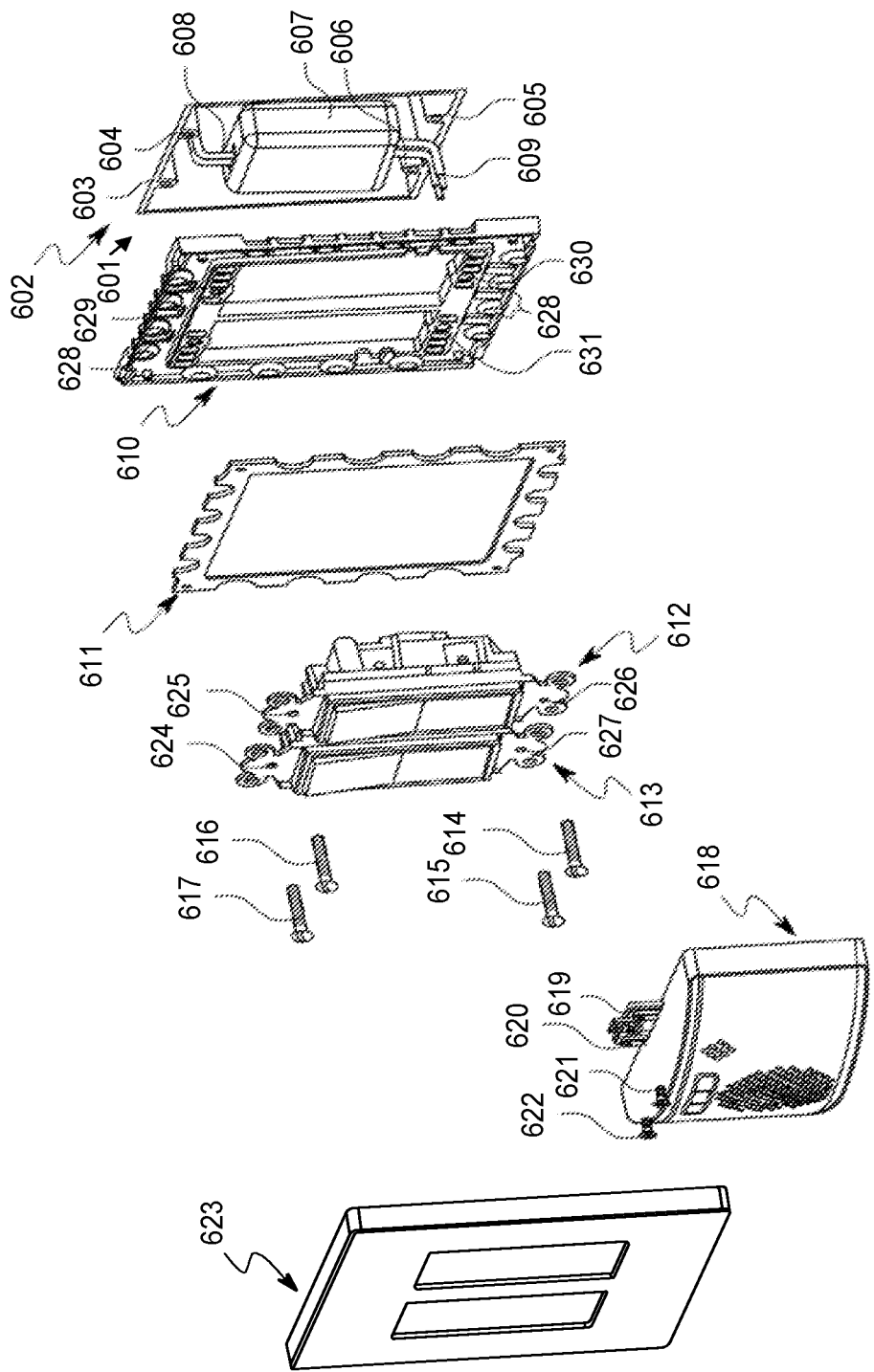
FIG. 6 shows an exploded view of an example of a dual gang modular faceplate system. This is an exploded view of FIG. 5.

FIG. 6 shows an exploded view of an example of the components that were depicted in FIG. 5 (which may be included in an embodiment of system 100). 601 depicts a wall with a cutout for a dual gang electrical junction box 602. The electrical junction box may include 4 screw hole openings 603, 604, 605, and/or 606. An AC to DC power supply 607 may reside inside of the electrical box 602. High voltage AC wires 608 may connect to the input of the AC to DC power supply 607. Wires 609 attach to the output section of the AC to DC power supply 607, which may be used to supply DC power and may include wires that may be used as data communication wires that connect to the PCB 611 of the baseplate 610. Baseplate 610 may be and/or may include a plate that supports electrical wiring for carrying data and power. PCB 611 may attach to the baseplate 610. 612 and 613 may be a pair of electric light switches. Openings 624, 625, 626, and 627 may be screw-hole openings on the light switch flanges. Screws 614, 615, 616, and 617 depict four installation screws (which may be replaced by other fasteners) that may fasten the light switches 613 and 612. Screws 614, 615, 616, and 617 may be inserted through the light switch electric component flange screw hole openings 624, 625, 626, and/or 627, through the baseplate screw hole openings 628, 629, 630, and/or 631, and into the electrical box screw hole openings 603, 604, 605, and/or 606. When the screws are fully threaded and fastened into place, the light switches 612 and 613, and baseplate 610, may be secured onto the electrical junction box 602 and the baseplate may be pressed tightly onto the wall 601. Accessory 618 may be a smart speaker accessory that can be installed onto the baseplate 610. Openings 620 and 619 may be screw-hole openings and may include brass inserts into which two installation screws may be fastened. Screws 622 and 621 may be installation screws that fasten through openings 620 and 619 and attach onto the attachment position 628 for the accessory located on the bottom of the baseplate, as depicted. Cover plate 623 installs over and protects the baseplate 610.

Figure 7:
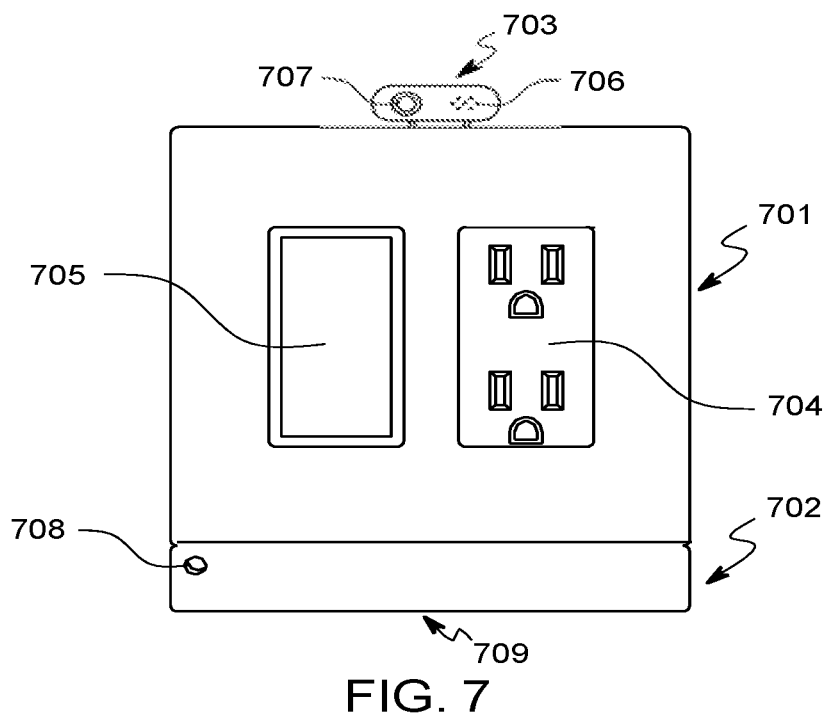
FIG. 7 shows an embodiment of a fully assembled dual gang modular faceplate system with an electric receptacle outlet in the decorator style and a light switch component in the decorator style along with a camera accessory attached at one of the top attachment points of the system and a presence sensor accessory attached at one of the bottom attachment points of the system.

FIG. 7 shows a fully assembled dual gang system 701 (which may be included in an embodiment of system 100) with an electric outlet in the decorator style 704, a light switch in the decorator style 705, and a camera accessory 703 attached at one of the top attachment points of the system 100. FIG. 7 also shows dual gang system 701 having a presence sensor accessory 702 attached at one of the bottom attachment points of the system 701. The camera accessory 703 further depicts a camera lens and sensor 707 and a microphone and speaker opening 706 for the microphone and speaker found inside of the camera accessory 703. The presence sensor accessory 702 further depicts a lens and sensor 708, which is used by an internal passive infrared sensor (PIR) and light sensor. The PIR sensor can be used to detect motion. Throughout this specification, the PIR sensors can be replaced with other motion detectors to obtain different embodiments. The internal light sensor can sense ambient room brightness levels. The presence sensor 702 may include light 709 which may be Red, Green, and/or Blue Light Emitting Diodes (RGB LEDs) present along the bottom of the accessory. RGB LEDs are just one example of lights that may be used. LED or other lights of other colors may also be used. For example, red, yellow, and green may be used instead of red, green, and blue. Because both installed camera accessory 703 and presence sensor accessory 702 are connected onto the same system 701, camera accessory 703 and presence sensor accessory 702 have the ability to share communication through the PCB present on the baseplate of the dual gang system 701 (for example). Alternatively, or additionally, different accessories may be capable of being communicatively coupled to one another directly, such as by wired connectors, plugin connectors, and/or by wireless communications. Alternatively, or additionally, accessories may be communicatively coupled with devices that are not attached to the system 701 or any similar modular panel. For example, one or more of the accessories may control, may be controlled by, and/or communicate with a security system, which may be a security system of a house or a building. Sharing communications between accessories allows two or more accessories to share functionality and/or sensor data from each other that may not otherwise be possible by each independent accessory on its own. For example, if the presence sensor accessory 702 detects motion, via its PIR sensor 708, presence sensor accessory 702 may relay data communication about the detected movement to the camera accessory 703 by way of the baseplate's PCB. The camera accessory 703 can be configured to perform certain actions when data communication is received by the presence sensor accessory 702. For example, the camera accessory 703 may be configured to only record video when a motion event is detected by the presence sensor 702 and data communication about that event is sent to the camera accessory 703. As another example, the camera accessory 703 may include an internal microphone and may detect a series of noises that resemble human voices, via its internal microphone. The camera accessory 703 could be configured to relay data communication events to the presence sensor 702 when human voices are heard, which when received by the presence sensor 702, may cause the presence sensor 702 to emit light (or emit another alert). Although in the discussion of FIG. 7 just two examples are given of how two separate accessories may work together to provide additional functionality and features that may not otherwise be possible if only one of the accessories were present.

Figure 8:
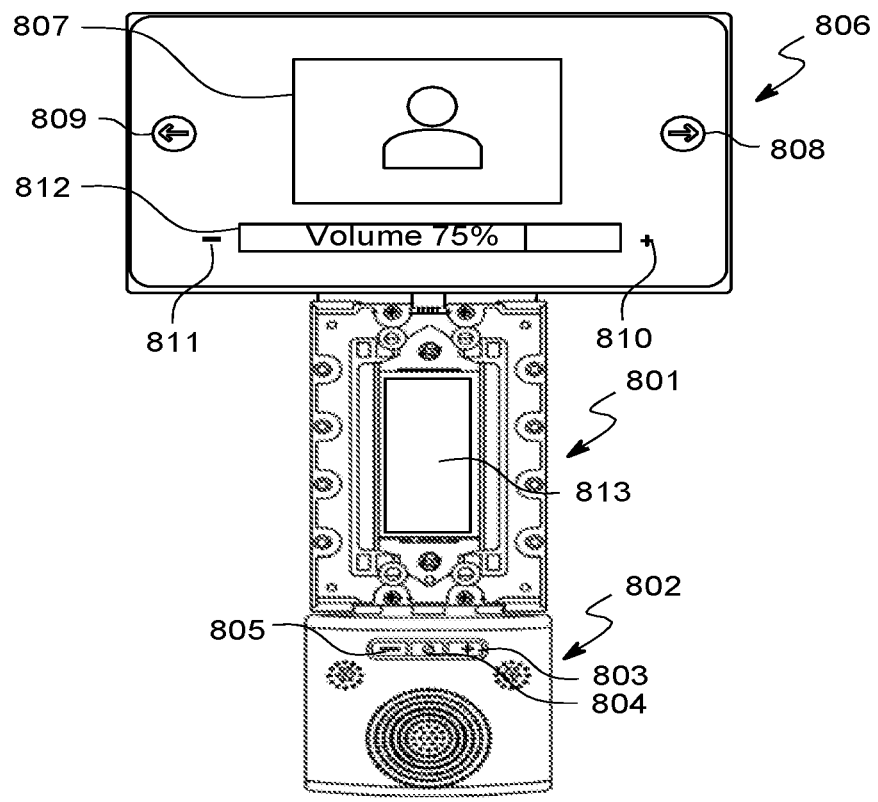
FIG. 8 depicts an embodiment of a baseplate with a touch screen accessory installed on the top accessory attachment position and a speaker accessory attached at the bottom accessory attachment position.

FIG. 8 depicts a baseplate 801 with a touch screen accessory 806 installed on the top accessory attachment position and a speaker accessory 802 attached at the bottom accessory attachment position (which may be included in an embodiment of system 100). Component 813 may be a light switch installed onto the baseplate 801. Controls 803, 804, and/or 805 may be used to control the sound output of the speaker accessory 802. As an example, control 803 may be a volume up button and may be used to turn up the sound output of the speaker 802. As another example, control 804 may be a mute button and can be used to mute the sound output of the speaker 802. As another example, control 805 may be a volume down button and may be used to turn down the sound output of the speaker 802. Two or more accessories that are attached on the same baseplate may be set up so as to work together to provide additional user experiences that may not be independently possible on their own. For example, the touch screen accessory 806 may display a graphical user interface that corresponds to music playing from the attached speaker accessory 802 (or a remote speaker). Screen 807 may include a picture area that may represent a photo of the artist or album that is currently playing from the speaker accessory. Control 808 may be a "next track" button that may, when touched, cause the speaker accessory to play the next track in a queue. Likewise, control 809 may be a "previous track" button that may, when touched, cause the speaker accessory to play the previous track in the queue. Volume display 812 may be a graphical representation of the current volume level of the speaker accessory. In an embodiment, if a user pressed the volume up button 803 on the speaker accessory 802, the graphical element on the touch screen 806 may optionally update to indicate that the volume level has changed. In an embodiment, volume up 810 and/or volume down 811 may be graphical representations found on the touch screen elements which when activated (e.g., pressed) may cause the volume level of the speaker accessory to go up or down, respectively. Music play back is just one example of how the smart speaker accessory 802 and touch screen accessory 806 may work together. Many other examples, including those not related to music playback and control may also be implemented with touch screen accessory 806. While a touch screen and a speaker accessory are depicted, they are only given as an example. Any number of accessories and type of accessories may be present and may offer various additional user experiences that may not be independently possible on their own. Examples of the types of accessories that may be present may include speakers, cameras, touch screen devices, visual displays, lighting, motion sensors, additional buttons, finger print sensors, bar code scanners, batteries, smoke detectors, $CO_2$ sensors, temperature sensors, fragrance dispensers, microphones, and/or lighting control devices. Some more examples of types of accessories that may be present may include Wi-Fi access points, repeaters, cover plates, touch cover plates, voice assistants, timers, any electronic device, and/or any non-electronic device. The baseplate PCB may be a unifying element that allows attached accessories to relay digital communication and power to and from each other. It should be noted that while the baseplate may be used as a relay, the accessories may also communicate with each other via other wireless communication means.

Figure 9B:
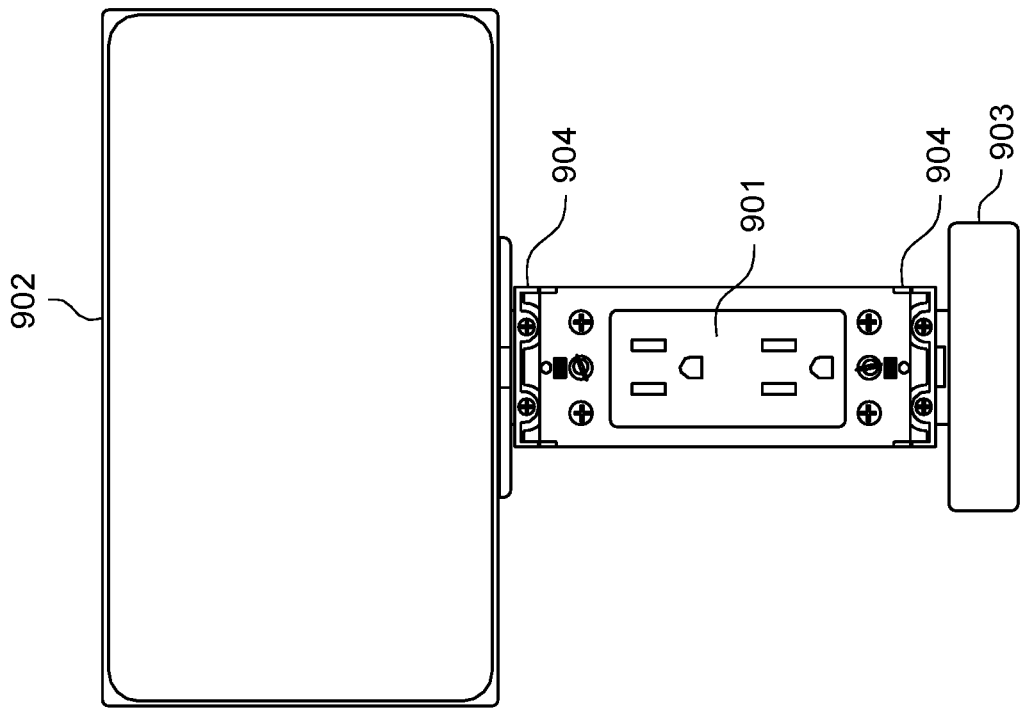
FIG. 9B depicts an example of the same embodiment as FIG. 9A, but with the cover plate removed exposing the electric component flanges and Accessory Attachment Modules.
Figure 9A:
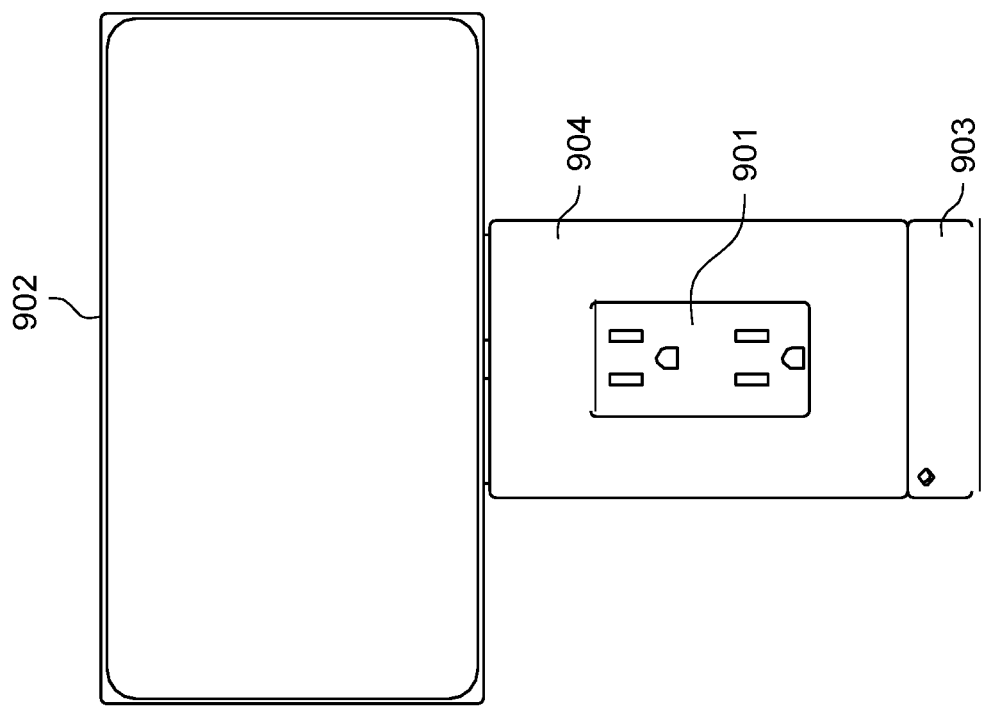
FIG. 9A depicts a front view of an embodiment of an electrical component in its fully assembled state, along with a cover plate installed and a touchscreen accessory attached at the top and a Presence Sensor accessory attached at the bottom.

FIG. 9A depicts an embodiment of an electric component 901 from a front view in its fully assembled state, along with a cover plate installed 904 and a touch screen accessory 902 attached at the top and a presence sensor accessory 903 attached at the bottom (which may be included in an embodiment of system 100). The touch screen accessory 902 and presence sensor accessory 903 may be embodiments f presence sensor accessory 702 and touch screen accessory 806.

FIG. 9B depicts the same embodiment as FIG. 9A, but with the cover plate 904 removed exposing the electric component flanges and Accessory Attachment Modules (AAMs) 904. The electric component functions as a normal electrified outlet as found in homes/buildings today, but include additional attachment elements on the top and bottom flanges which allow for Accessory Attachment Modules 904 (AAMs) to be installed. When the AAMs 904 are installed, a user could install accessories like the touch screen accessory 902 and presence sensor 903 as depicted in FIG. 9A and FIG. 9B. While two accessories 902 and 903 are shown with two AAMs 904 any number of accessories and AAMs 904 may be present. If the AAMs 904 are not installed, an embodiment of an electric component 901 may be installed with a baseplate. Optionally, electric component 901 may provide Direct Current (DC) power to the baseplate. Additionally, when the AAMs 904 are not installed a user may install an embodiment of an electric receptacle as a normal electric receptacle with no additional features.

Figure 10B:
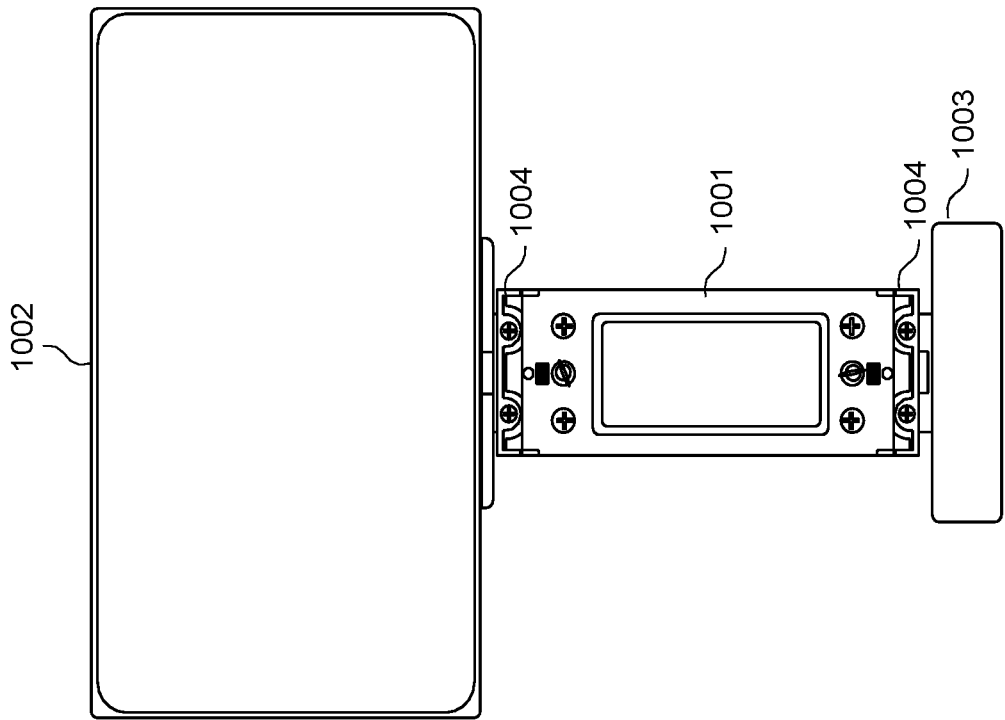
FIG. 10B depicts an example of the same embodiment as FIG. 10A, but with the cover plate removed exposing the light switch flanges and Accessory Attachment Modules.
Figure 10A:
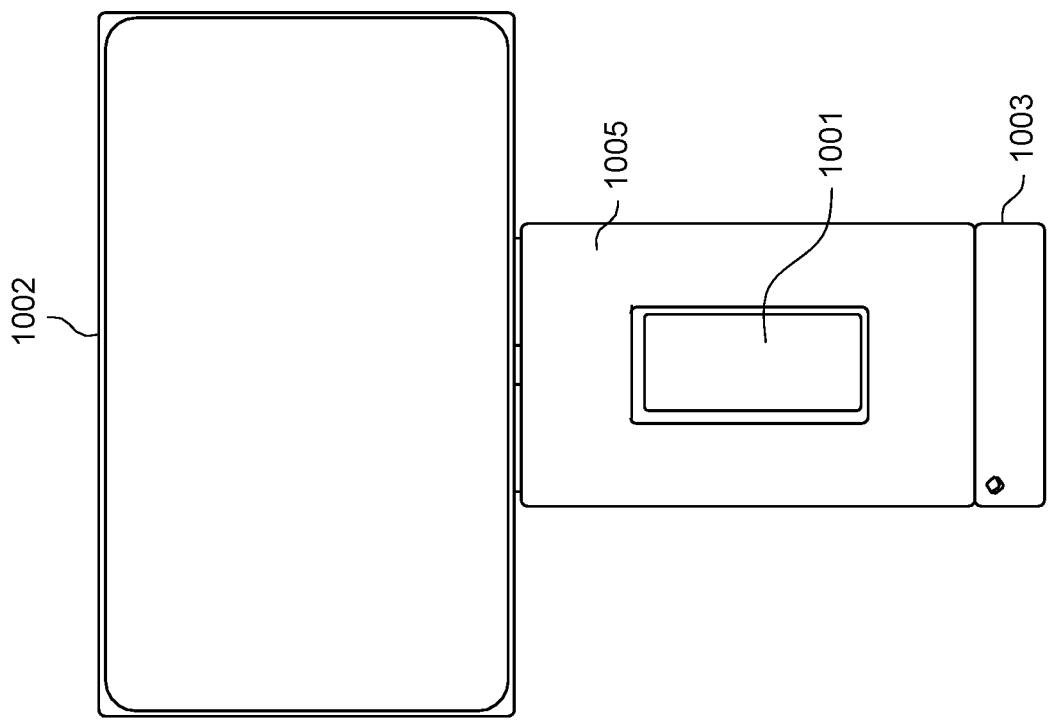
FIG. 10A depicts a front view of an embodiment of a light switch in its fully assembled state, along with cover plate installed and a touchscreen accessory attached at the top and a Presence Sensor accessory attached at the bottom.

FIG. 10A depicts an embodiment of a light switch 1001 from a front view in its fully assembled state, along with a cover plate installed 1005 and a touch screen accessory 1002 attached at the top and a presence sensor accessory 1003 attached at the bottom (which may be included in an embodiment of system 100). The accessories are the same embodiments as shown to work with the baseplate and an embodiment of an electric component. FIG. 10B depicts the same embodiment as FIG. 10A, but with the cover plate 1005 removed exposing the light switch flanges and Accessory Attachment Modules 1004. The light switch functions as a normal light switch as may be found in homes/buildings today used to control lighting or fans etc., but include additional attachment elements on the top and bottom flanges which allow for Accessory Attachment Modules 1004 (AAMs) to be installed. When the AAMs 1004 are installed, a user could install accessories, like the touch screen accessory 1002 and presence sensor 1003, as depicted in FIG. 10A and FIG. 10B. While two accessories 1002 and 1003 are shown with two AAMs 1004 any number of accessories and AAMs 1004 may be present. If the AAMs 1004 are not installed, an embodiment of a light switch 1001 may be installed with a baseplate. Optionally, light switch 1001 may provide Direct Current DC power to the baseplate (e.g., instead of the AAMs). Additionally, when the AAMs 1004 are not installed a user may install an embodiment of a light switch as a normal light switch for controlling lighting, fans etc. with no additional features or accessory attachment features.

Figure 11B:
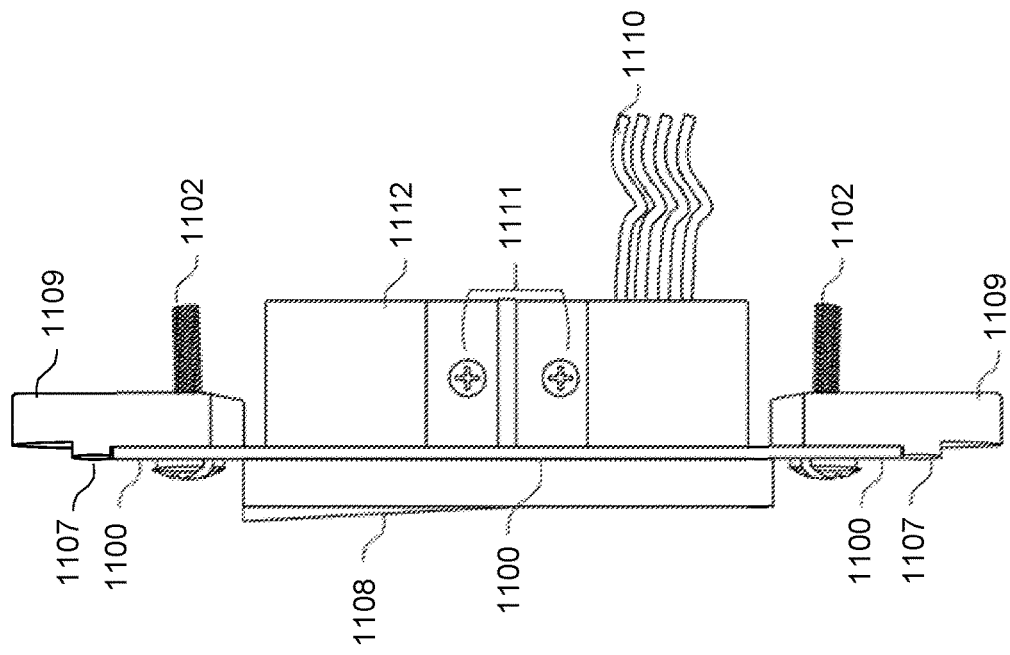
FIG. 11B shows a side view of an embodiment of the same light switch.
Figure 11A:
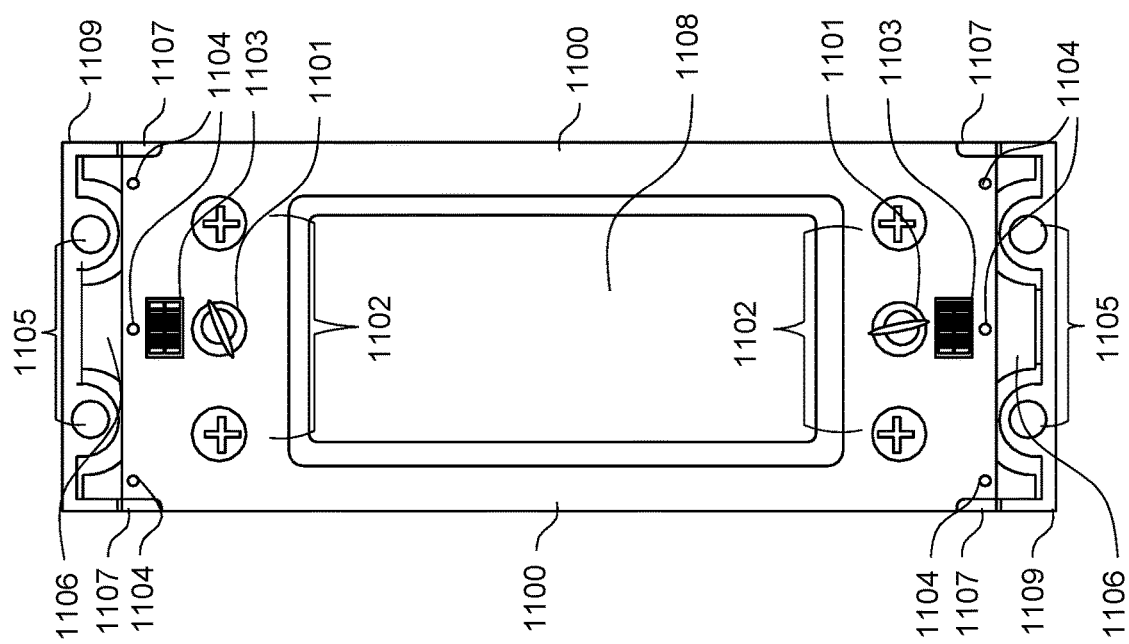
FIG. 11A shows a front view of an embodiment of a light switch.
Figure 11C:
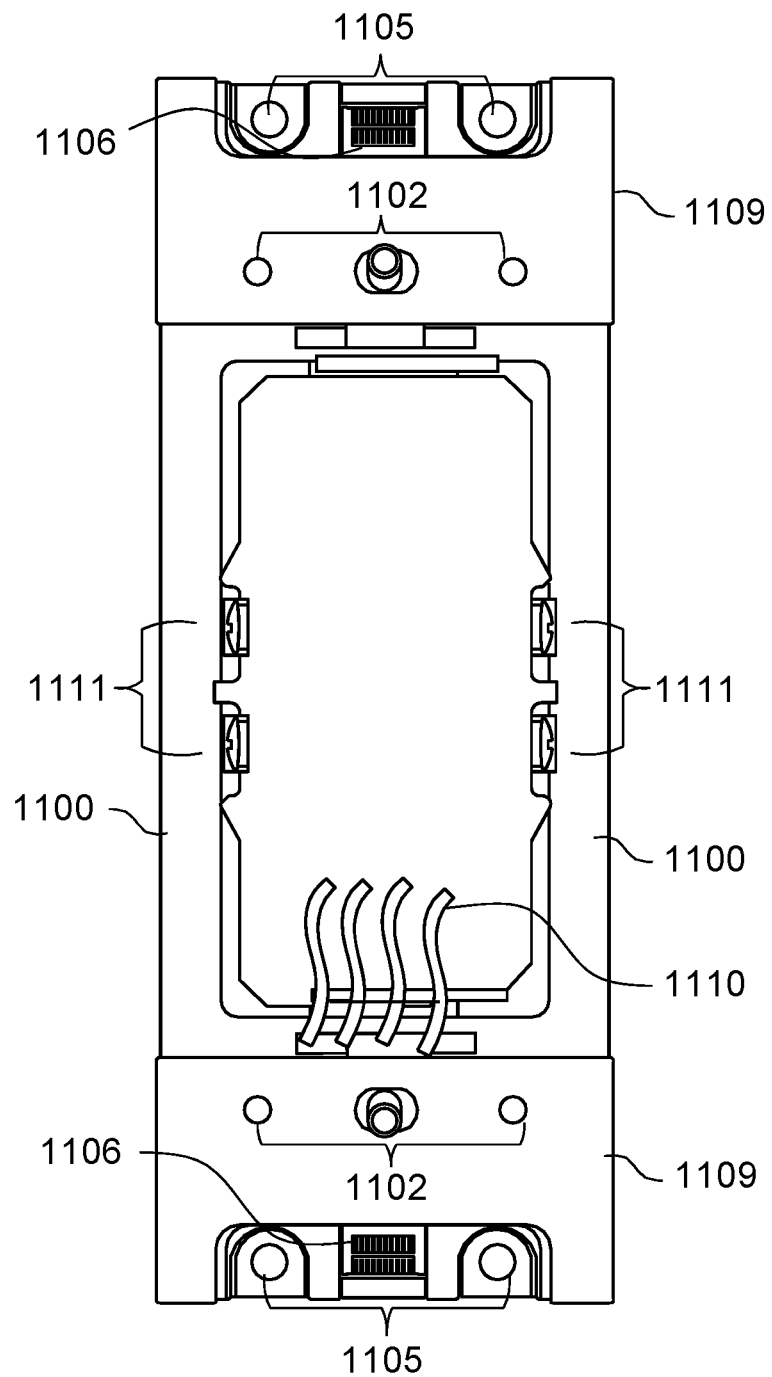
FIG. 11C shows a rear view of an embodiment of the same light switch.

FIG. 11A shows an embodiment of a light switch from a front view (which may be included in an embodiment of system 100). FIG. 11B shows the same light switch from a side view. FIG. 11C shows the same light switch from a rear view. 1100 may be the flanges that surround the entire front body of the light switch. The appearance of the flange is identical to an embodiment of an electric component. 1101 may be the two spots where the flange of the light switch can be secured onto a junction box. The location of the 1101 may be exactly in the same location as traditional light switch products, as to ensure that installation may be possible into homes and buildings using preexisting standards. 1103 may be an opening in the flange 1100 that exposes the front side of the PCB located behind the flange. This exposed section of PCB contains traces which can be used by an embodiment of a touch cover plate if desired. 1103 is depicted on the top and bottom of the flange but various embodiments of a light switch may have only one or no openings at all. 1104 may be various screw-hole openings that can be used to attach a cover plate or traditional faceplate. The center of the three screw hole openings shown in 1104 on the top and bottom flange comply with standards for available faceplates that attach to light switches and electric components. The other screw hole openings shown in 1104 (on the left and right) are present for attaching non industry standard faceplates or cover plates which are designed exclusively for use with an embodiment of a light switch. 1109 may be the Accessory Attachment Module (AAM) and is depicted installed onto an embodiment of a light switch at the top and bottom positions of the flange 1100. 1105 may be an accessory attachment position which can be used to install additional accessories, for example, a speaker accessory, or a presence sensor accessory. 1106 may be the PCB present on the AAM which attached accessory circuitry may contact in order to obtain and provide data signals and/or electric current. The opposite side of the AAM PCB contacts the PCB located at the top and bottom positions of an embodiment of a light switch's flange. When contact is made, data communication, and/or power are relayed from the internal circuitry of an embodiment of a light switch and passes through the AAM PCB and to any attached accessory. If the AAM is not installed, the PCB and any relating connectors of the light switch may be exposed, which can be used to mate with the baseplate PCB in order to relay power and/or data communication from an embodiment of a light switch to the baseplate and any attached accessories of the baseplate. Additionally, when the AAM is not present, the exposed circuitry of an embodiment of a light switch may be removed in order to use the light switch as a traditional light switch with no additional features. 1107 may be a raised protrusion on the AAM 1109 which mates with a recess found on the light switch flange. 1108 may be the physical switch of the light switch in the style of decorator style. While decorator is shown here, any style may be present. 1110 may be the High Voltage Alternative Current (AC) wires that are typically present on a light switch and connect to high voltage wiring found in most buildings. These wires may include a Ground, Hot, Neutral and Load wire. Likewise, 1111 may be screws where high voltage wiring can be connected. 1112 may be the enclosure where the internal circuitry of an embodiment of a light switch is present. Internal circuitry includes circuitry common to light switches that exist today, in addition to an AC to DC power supply that can be used to supply DC current to attached accessories, via installed AAMs 1004 or to baseplates where an embodiment of a light switch is installed. Additional circuitry may be present inside of an embodiment of a light switch enclosure 1112 including, but not limited to, processors, wireless communication modules that support common standards like Wi-Fi, Bluetooth, Zigbee, and/or any other circuitry. While a system with a removable AAM is described above, an embodiment of this invention may be a permanently attached AAM system which may effectively give an embodiment of a light switch permanent accessory attachment points on the flange.

Figure 12A:
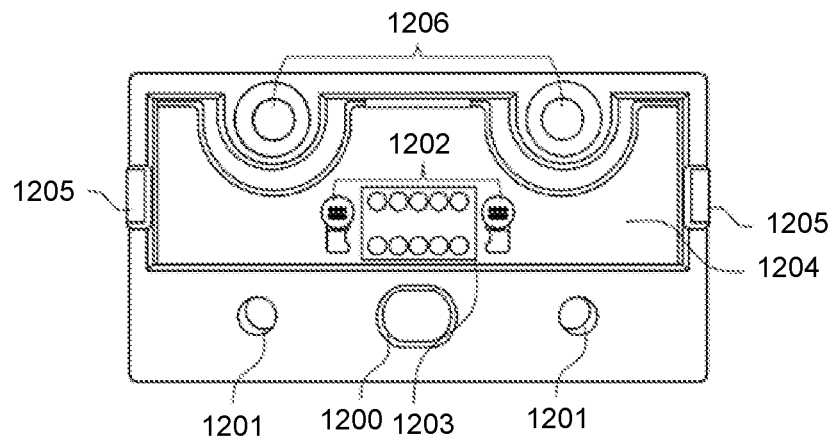
FIG. 12A shows a front view of an embodiment of the Accessory Attachment Module (AAM).
Figure 12B:
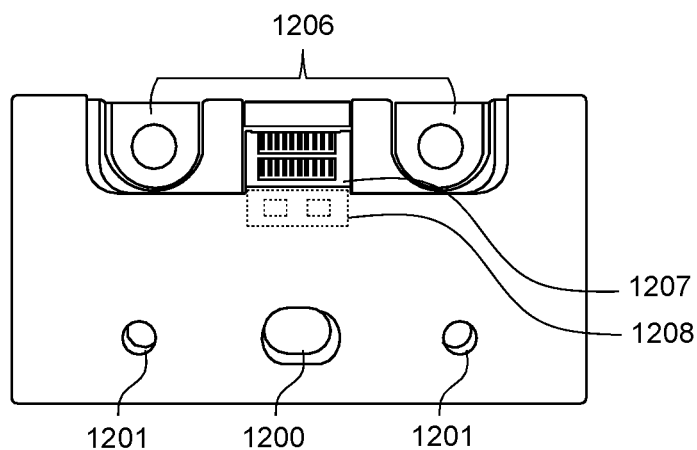
FIG. 12B shows a rear view of an embodiment of an Accessory Attachment Module (AAM).
Figure 12C:
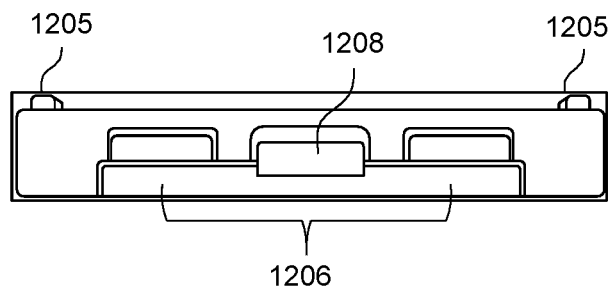
FIG. 12C shows a top view of an embodiment of the same AAM.

FIG. 12A shows an Accessory Attachment Module (AAM) from a front view (which may be included in an embodiment of system 100). FIG. 12B shows the same AAM from a rear view. FIG. 12C shows the same AAM from the top view. 1200 shows a wide screw hole opening for the screw that is used to secure an embodiment of a light switch or an embodiment of an electric component to the junction box. The screw hole opening is wider than the area needed for just a screw. The extra space is for adjustment of the entire system in case the junction box or wall opening is not level or crooked by allowing the user to adjust the angle of the system to their liking. Openings 1201 may be screw-hole openings used to attach the AAM to the flanges of an embodiment of a light switch or electric component. 1202 and 1203 depict traces on the PCB board 1204 of the AAM. 1202 depict wider traces to accommodate direct current electricity from an embodiment of an electric component or an embodiment of a light switch while 1203 may be several much smaller traces for the purpose of data communication from or to an embodiment of an electric component or an embodiment of a light switch. Protrusion 1205 may be a protruding body that is used to align and mate with cutouts of an embodiment of a light switch or an embodiment of an electric component. This protrusion helps secure the AAM. 1206 may be an accessory attachment point. In an embodiment, the accessory attachment point is the same as the accessory attachment points found on the baseplate. Electrical connections 1207 and 1208 may be traces on the AAM PCB that are used to mate and connect with any attached accessory. Electrical connection 1208 is shown with dashes on FIG. 12B, as it is not visible from the rear view. In an embodiment, the structure illustrated by FIG. 12C includes a deeper concave opening design for the deep connection of an accessory.

Figure 13A:
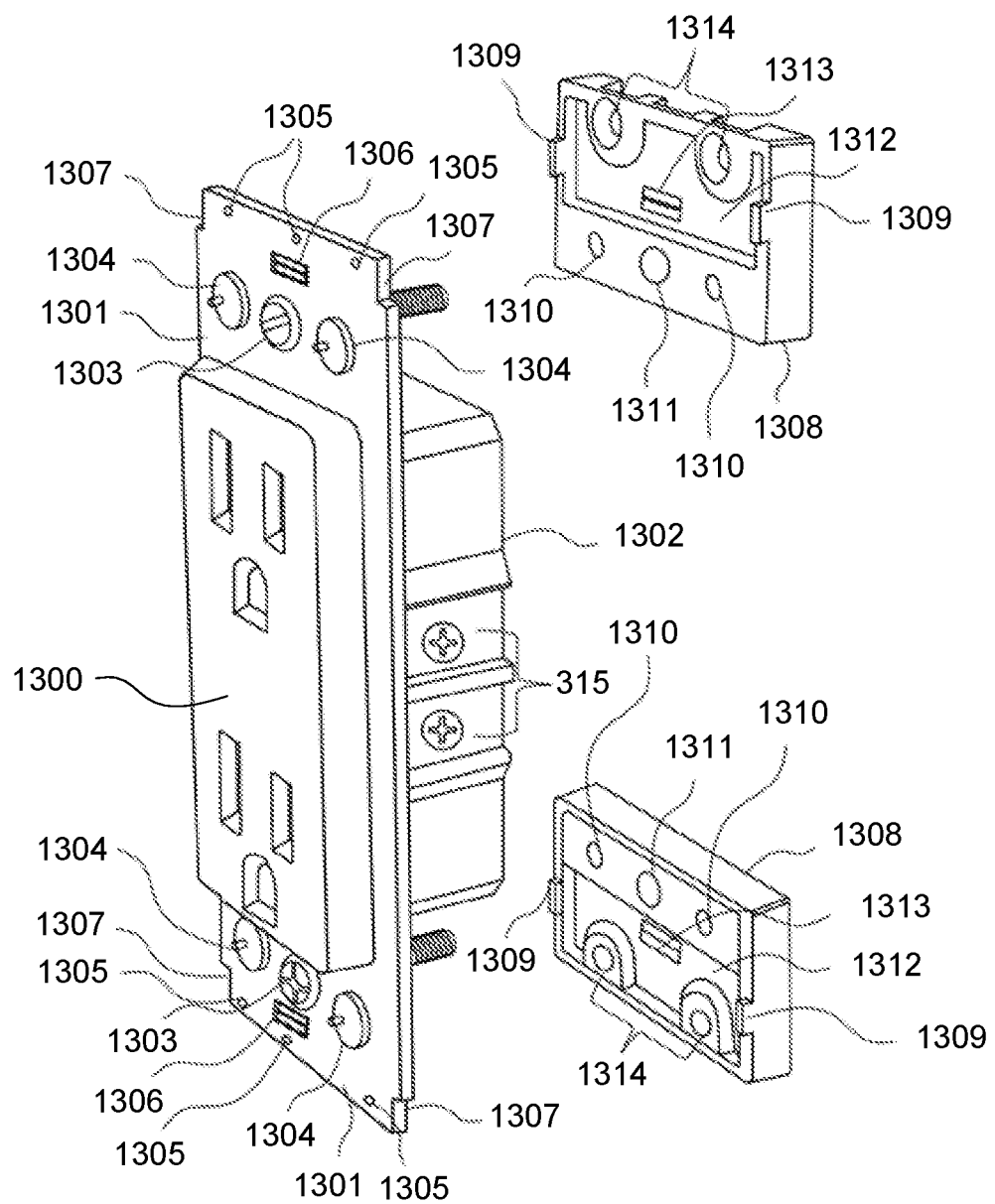
FIG. 13A shows a front exploded view of an embodiment of an electric component with the Accessory Attachment Module removed.
Figure 13B:
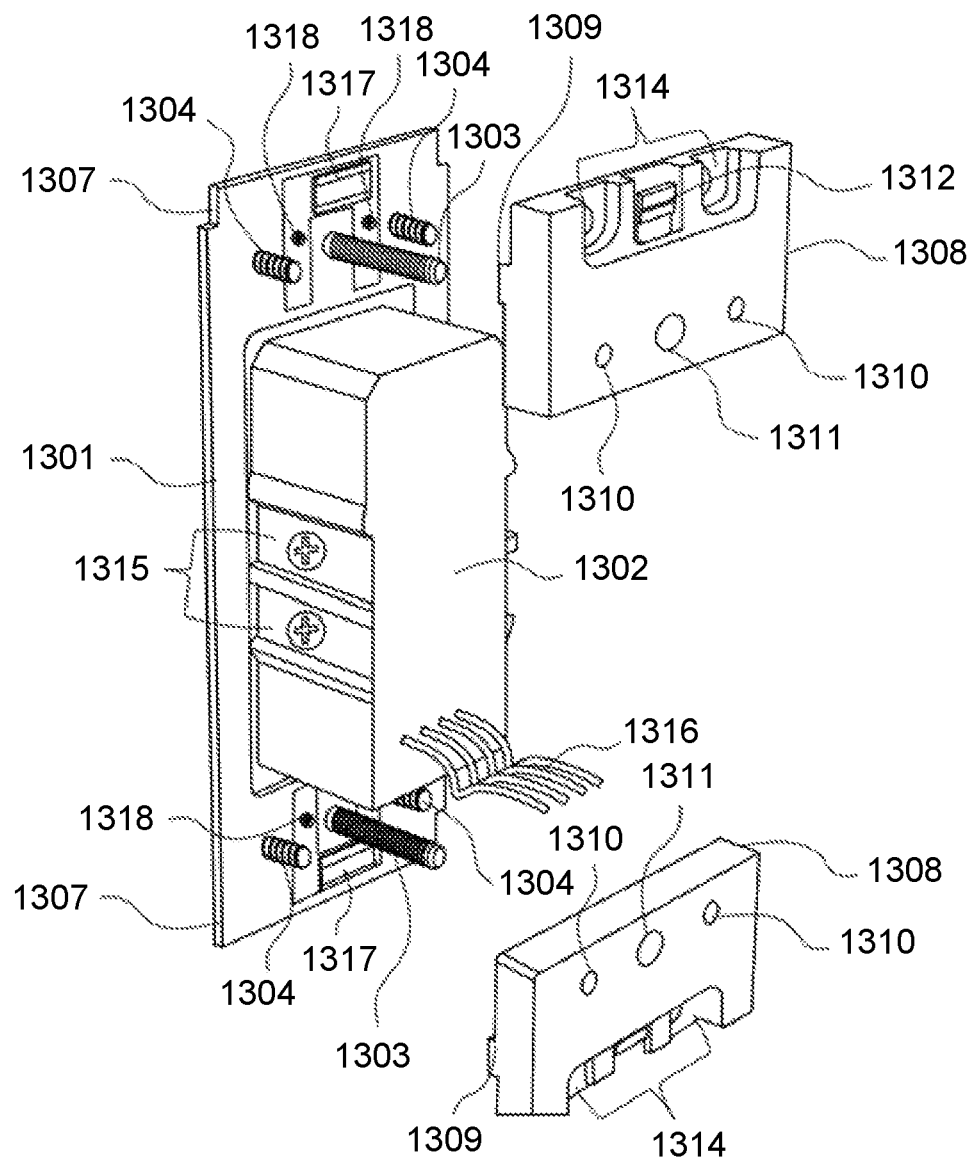
FIG. 13B shows an exploded, rear, side view of an embodiment of the same electric component and AAM.

FIG. 13A shows an embodiment of an electric component from a front angled perspective view with Accessory Attachment Module removed and shown in an exploded view (which may be included in an embodiment of system 100). FIG. 13B shows the same electric component and AAM of FIG. 13 A, but from a rear side exploded view. While an electric component and AAM are shown in FIG. 13A, embodiments of a light switch and the embodiment of the depicted electric component may be the same, which in this embodiment, effectively makes the rear angled perspective view of FIG. 13B an exact depiction for the rear view of an embodiment of the light switch of FIGS. 11A, B and C. Front face 1300 may be the front face of an embodiment of an electric component with receiving plug openings, which is adapted for use in North America. Flanges 1301 may be flanges that may surround the entire front body of the electric component of FIGS. 13A and 13B. In an embodiment, the appearance of the flange 1301 is identical in the views of FIGS. 13A and B. Spots 1303 may be the two (or more) spots where the flange of the electric component can be secured onto a junction box. The location of the spots 1303 may be exactly in the same location (within a predetermined tolerance) as traditional electric component products, as to ensure that it can be installed into homes and buildings using preexisting standards (or may be elsewhere). Opening 1306 may be an opening in the flange 1301 that exposes the front side of the PCB located behind the flange. This exposed section of PCB may be electrical connectors (e.g., traces), which can be used by an embodiment of a touch cover plate if desired. Although openings 1306 are depicted on the top and bottom of the flange, in various other embodiments of the electric component there may only be one or no openings. Openings 1305 may be various screw-hole openings that can be used to attach a cover plate or traditional faceplate. In an embodiment, the center of the three screw-hole openings 1305 may be adapted for available faceplates to attach to light switches and electric components. The other screw hole openings 1305 (to the left and right) are present for attaching non industry standard faceplates or cover plates which are designed exclusively for use with an embodiment of an electric component or light switch. 1308 may be the Accessory Attachment Module (AAM) and both are depicted in an exploded state in order to show how connection with the flange of an embodiment of a light switch and an embodiment of an electric component is made. In order to install the AAM, the screws depicted in 1304 can be used to install through an embodiment of an electric component or an embodiment of a light switch flange and into the screw hole opening on the AAM shown via 1310. The AAM shown in FIGS. 13A, and B and FIGS. 11A, B, and C may be the same embodiments except rotated 180 degrees in order to fit either the top flange or bottom flange positions. 1312 show the PCB of the AAM. 1313 shows traces exposed on the PCB 1312 for the purpose of makings electrical connections with the PCB of an embodiment of a light switch or an embodiment of an electrical component. The PCB of 1312 is also shown in the rear view in FIG. 13B with another area of exposed PCB traces. The rear-view exposed traces are used for contacting any attached accessory circuitry. 1314 represent the accessory attachment points of the AAM. 1316 may be the High Voltage Alternative Current (AC) wires that are typically present on an electric component and connect to high voltage wiring found in most buildings. These wires may include a Ground, Hot, Neutral and Load wire. Likewise, 1315 may be screws where high voltage wiring can be connected. 1302 may be the enclosure where the internal circuitry of an embodiment of an electric component is present. The internal circuitry may include circuitry common to electric components that exist today, in addition to an AC to DC power supply that can be used to supply DC current to attached accessories, via installed AAMs, or to baseplates where an embodiment of an electric component is installed. Additional circuitry may be present inside of the embodiment of the electric component enclosure 1302 including, but not limited to, processors, wireless communication modules that support common standards like Wi-Fi, Bluetooth, Zigbee, or any other circuitry. In an embodiment, while a system with a removable AAM is described above, an embodiment of this invention may include a permanently attached AAM system, which may effectively give this embodiment of the electric component permanent accessory attachment points on the flange. 1317 may be the PCB present on the flange of an embodiment of an electric component and light switch component an exposed connection point is depicted on the PCB for the purpose of making contact with an AAM 1308 or with a baseplate. When a connection with an AAM is made, the exposed PCB connection point can transfer power and data communication to the AAM. The AAM PCB can then make power and data available to any attached accessory on the AAM. If the AAM is not installed on the flanges, the exposed connection point of the PCB 1317 of an embodiment of a light switch flanges or an embodiment of an electric component flanges can mate directly with traces present on the baseplate PCB. In at least one embodiment, this would allow power and data communication from light switch or electric component to flow to, and through, the baseplate. The baseplate can then make power and data communications available at each of its accessory attachment points. In at least one embodiment, this would allow an embodiment of the light switch or an embodiment of the electric component to act as the AC to DC power supply for the baseplate and would eliminate the need for the baseplate to have its own independent power supply. In an embodiment, this would be desired for cases where an independent power supply for the baseplate may not easily fit in a junction box. 1318 may be screws holding an embodiment of the light switch or embodiment of an electric component PCB attached to the rear flange area. It may be desired to remove this PCB and its exposed connection point. When removed, an embodiment of the light switch and electric component can function as a regular light switch or electric component. At least one embodiment of the AAM introduces additional depth that would not otherwise be present in a light switch or electric component and it may serve as a depth-creating element (e.g., a spacer). Extra depth serves to increase the total space available inside of a junction box, as a way to make room for an accessory attachment system and for creating an overall desired deeper aesthetic look of the fully assembled system with accessories.

Figure 14:
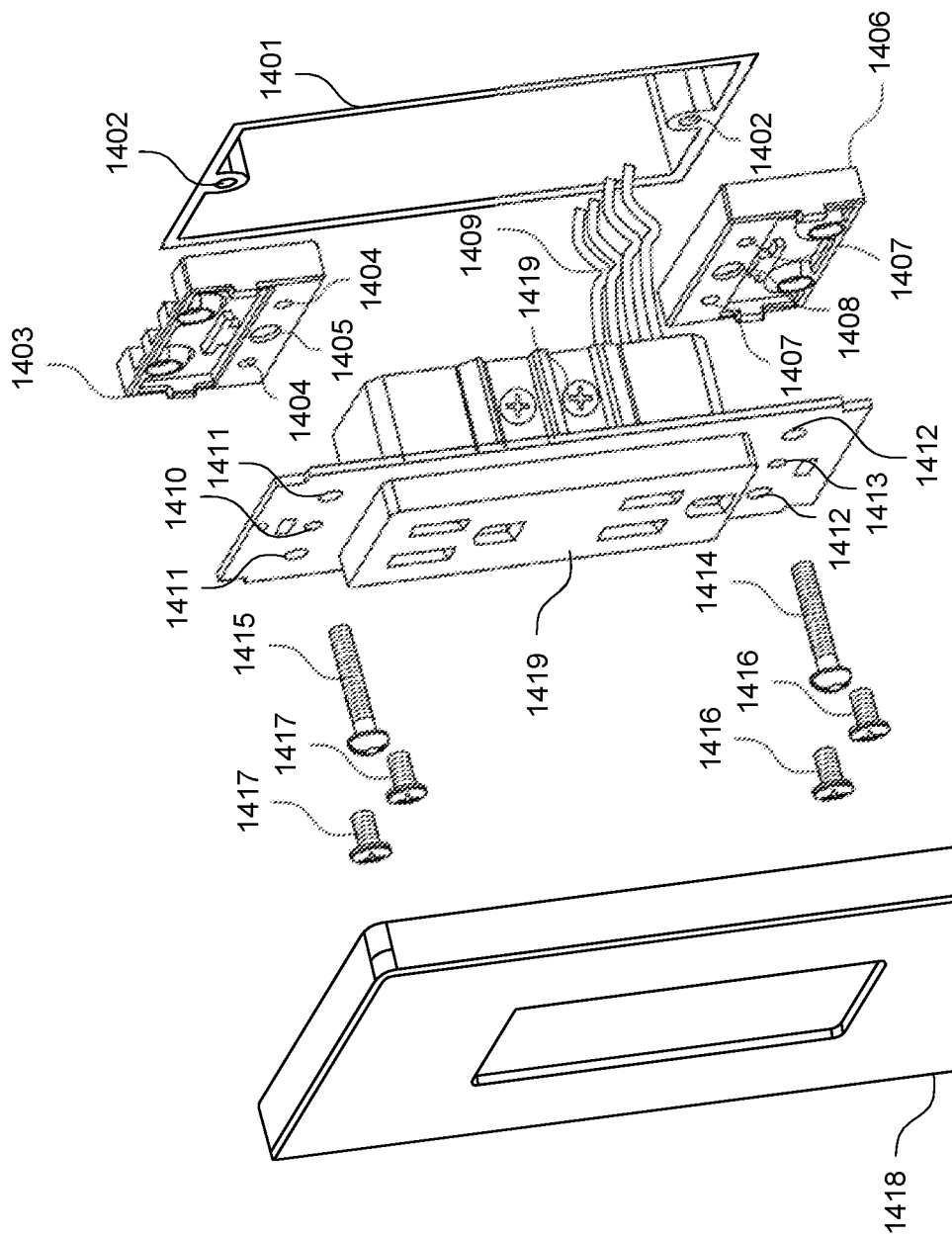
FIG. 14 shows an exploded view of the installation steps that might take place when installing an embodiment of an electric component system with Accessory Attachment Modules and a cover plate.

FIG. 14 shows an exploded view of the installation steps that might take place when installing an embodiment of the electric component system with Accessory Attachment Modules and a cover plate. 1401 may be a junction box installed inside of a wall. 1402 may be screw-hole openings typically found in junction boxes for the purpose of securing an electric component or light switch. 1403 may be an AAM that may be installed on the top flange of an embodiment of the electric component. 1404 shows the screw hole openings that may be used for the screw to attach the AAM to the flange of an embodiment of the electric component. 1406 may be a second AAM that may be installed on the bottom position of an embodiment of the electric component. 1407 may be the screw-hole openings that may be used to fasten the AAM to the flanges of an embodiment of the electric component (e.g., the embodiments of FIG. 14). 1409 depicts the high voltage AC wires that may be connected to the high voltage AC wires found inside of the junction box 1401 of the building. 1419 may be an embodiment of the electric component. 1417 may be two screws that may pass through the two screw-hole openings 1411 on the top flange of an embodiment of the electric component 11111 and thread into the openings of 1404. Likewise, 1416 may be two screws that may go through the openings 1412 and thread into the opening 1407 of the bottom AAM. 1415 may be a screw that may pass through the opening 1410 and through the opening of 1405 and into the junction box top screw hole opening 1402. Likewise, 1414 may be a screw that may pass through the opening 1413 and through the opening 1408 of the AAM and into the bottom junction box screw hole opening 1402. At this point, an embodiment of the electric component and AAMs are installed securely onto the junction box and wall. At this point, the cover plate 1418 can be installed into place.

Figure 15:
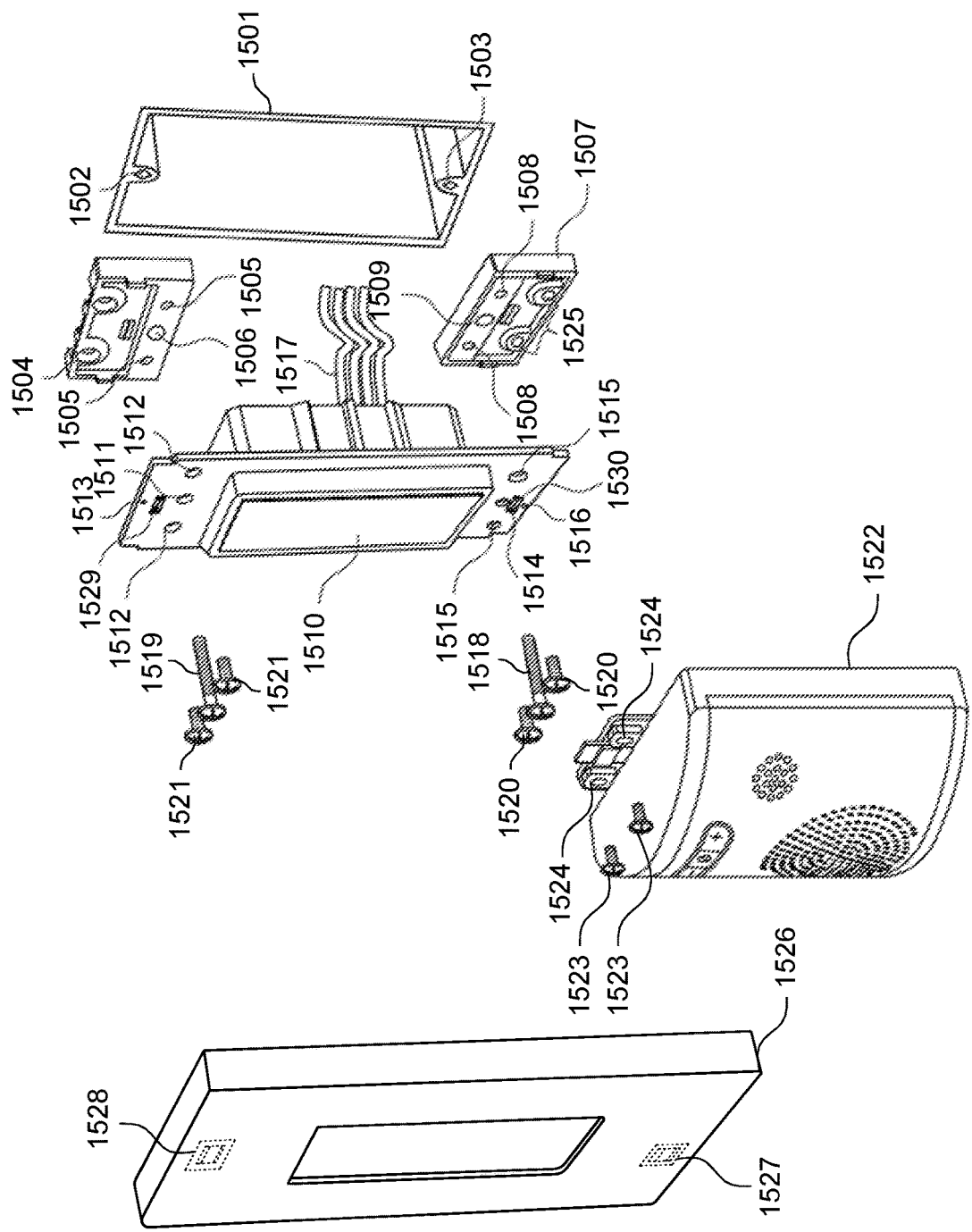
FIG. 15 depicts an exploded view of an example of the installation steps for installing an embodiment of a light switch with two AAMs, a speaker accessory attached on the bottom AAM, and a touch cover plate.

FIG. 15 depicts an exploded view of the installation steps for installing an embodiment of a light switch with two AAMs, a speaker accessory attached on the bottom AAM, and a touch cover plate (which may be included in an embodiment of system 100). 1501 may be a junction box installed in a wall. 1502 and 1503 depict screw-hole openings on the junction box. 1504 may be an AAM that may be installed on the top flange of an embodiment of the light switch. 1507 may be an AAM that may be installed on the bottom flange of an embodiment of the light switch. 1510 may be an embodiment of the light switch. 1520 may be screws that may fasten through the openings of an embodiment of the light switch bottom flange 1515 and into the screw hole openings 1508 of the bottom AAM. 1521 may be two screws that may fasten through the top flange screw-hole openings 1512 of an embodiment of the light switch and into the top AAM screw-hole openings 1505. The screw depicted in 1519 may then fasten through the screw hole opening 1511 of the top flange of an embodiment of the light switch and through the screw hole opening 1506 of the AAM and into the top junction box screw hole opening 1502. Likewise, the screw depicted in 1518 may fasten through the bottom flange screw hole opening 1514 of an embodiment of the light switch and through the 1509 screw hole opening of the bottom AAM and into the bottom junction box screw hole opening 1503. At this point, an embodiment of the light switch and AAMs may be securely fastened to the junction box and wall. Next, any desired accessories may be installed, such as the speaker accessory depicted as 1522. The screws depicted as 1523 may fasten through the accessory attachment point screw-hole openings 1524 and may fasten into the bottom AAM accessory attachment point screw-hole openings 1525. In an embodiment, the speaker accessory should be securely fastened, and in an embodiment, the speaker may extract power from the light switch through the AAM. Finally, the touch cover plate 1526 can be installed by pressing it into place over an embodiment of the light switch flange optionally until audible clicks are heard. This indicates that the touch cover plate has mated securely with the flanges of an embodiment of the light switch. Notice that 1527 and 1528 show a dotted outline indicating a PCB connection point that is not visible from this perspective view. The PCB connection points of 1527 and 1528 may mate and connect with the PCB connection point 1529 and 1530 that is exposed by a cutout on the flanges of an embodiment of the light switch. This may allow data and power to communicate to and from the touch cover plate.

Figure 16B:
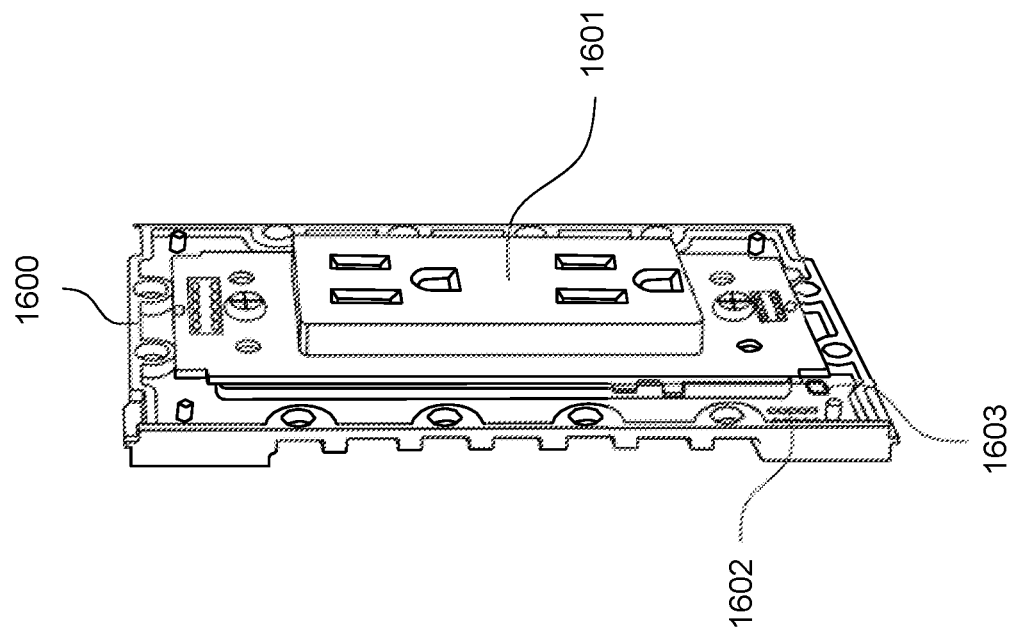
FIG. 16B shows a side perspective view of the same depiction of FIG. 16A.
Figure 16A:
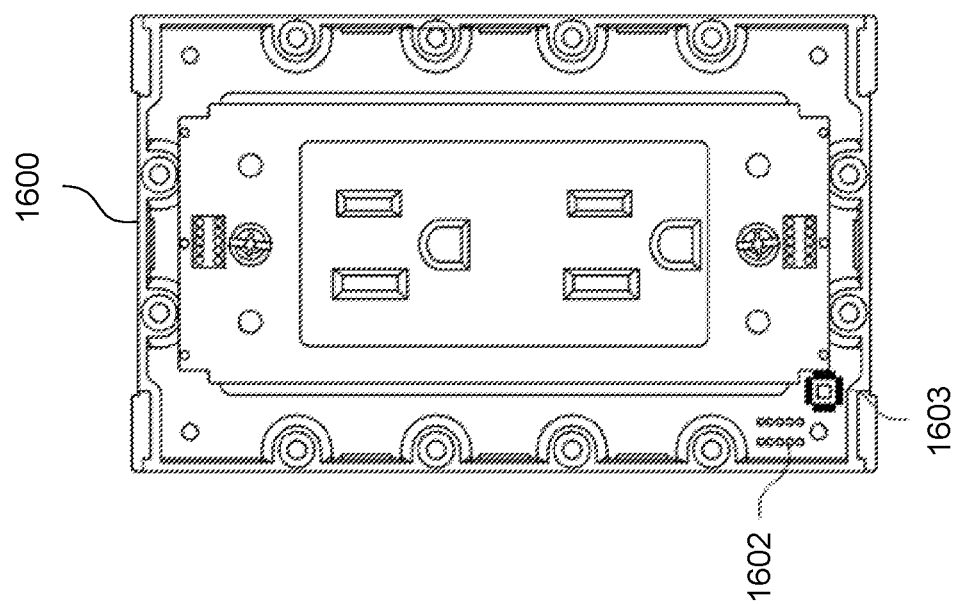
FIG. 16A shows an example of the front view of an embodiment of the baseplate and an embodiment of an electric component without AAMs, installed together.
Figure 16C:
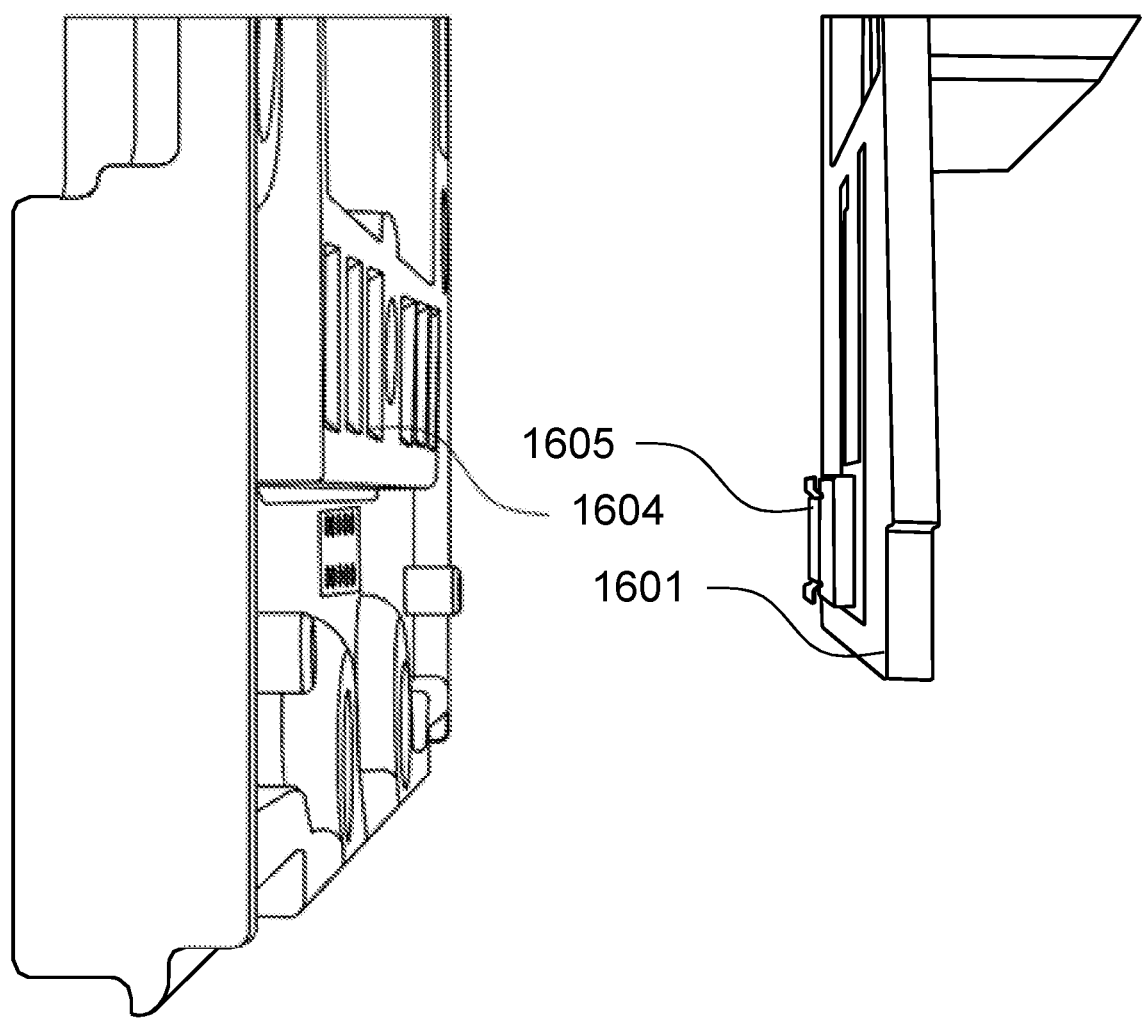
FIG. 16C shows a side perspective view of an example of the same embodiment from FIG. 16A and FIG. 16B but zoomed in to the bottom half of the baseplate and an embodiment of an electric component.

FIG. 16A shows the front view of an embodiment of the baseplate and an embodiment of an electric component without AAMs, installed together (which may be included in an embodiment of system 100). FIG. 16B shows the same depiction of 16A but from a side perspective view. FIG. 16C shows the same depiction from 16A and B, but zoomed in to the bottom half of the baseplate and an embodiment of an electric component from a side perspective view. 1600 shows an embodiment of the baseplate with additional features. These additional features include an additional connection point for a touch cover 1602 and an additional connection point for either an embodiment of a light switch or an embodiment of an electric component 1604. 1603 may be a processor module with Wi-Fi and Bluetooth connectivity, which may be built in to the baseplate PCB. 1603 may be an embodiment of the electric component, but for the purposes of this description, this embodiment of the light switch can also be pictured as 1601. FIG. 16A and FIG. 16B show an embodiment of the electric component fully installed together. In an embodiment, when the electric component or light switch is fully installed in this manner, the direct current DC, which may be required by the baseplate, and any attached accessories, may be obtained directly from the AC/DC power supply (or AC to DC power supply) that is located inside of the electric component or light switch. The DC current may be obtained, via the exposed connector, as depicted in the exploded view of FIG. 16C, via 1605. 1605 shows the connector that is present on the backside of the flange of an embodiment of a light switch and an embodiment of an electrical outlet. This exposed connector 1605 mates directly with PCB connection points present on the PCB of the baseplate 1604. When the baseplate and an embodiment of a light switch or an embodiment of an electric component are paired in this manner, an independent power supply for the baseplate normally installed inside of the junction box is not required. Because this embodiment of the baseplate has a processor and wireless Wi-Fi and Bluetooth capabilities, the wireless communication and processing power of the baseplate can be shared with the attached embodiment of a light switch and/or embodiment of an electric component and/or with any attached accessories attached on the baseplate. For example, consider an embodiment of a speaker accessory that is attached onto the baseplate at one of the attachment positions, but the speaker accessory does not have any wireless capabilities. The baseplate can relay wireless communication to and from the attached speaker accessory through one or more of the data pins that are present at the accessory attachment points. Likewise, consider an embodiment of the light switch or an embodiment of an electric component does not contain any wireless capabilities. It is possible for the baseplate to share wireless communication with an embodiment of the light switch or an embodiment of an electric component. As another example, it is possible for an embodiment of the baseplate to not have any wireless or processing capabilities. In at least one embodiment, it would be possible for the any of the attached accessories that have wireless capabilities or have processing power to share wireless capability and processing power with the baseplate itself, other accessories attached to the baseplate, any electric components and/or any light switches attached to the baseplate.

Figure 17B:
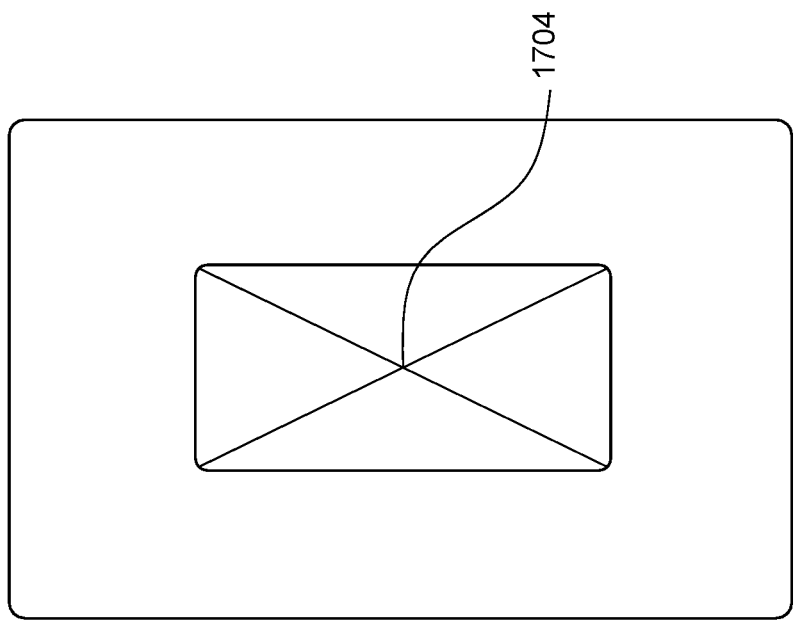
FIG. 17B shows the front side of an embodiment of the same cover plate as FIG. 17A.
Figure 17A:
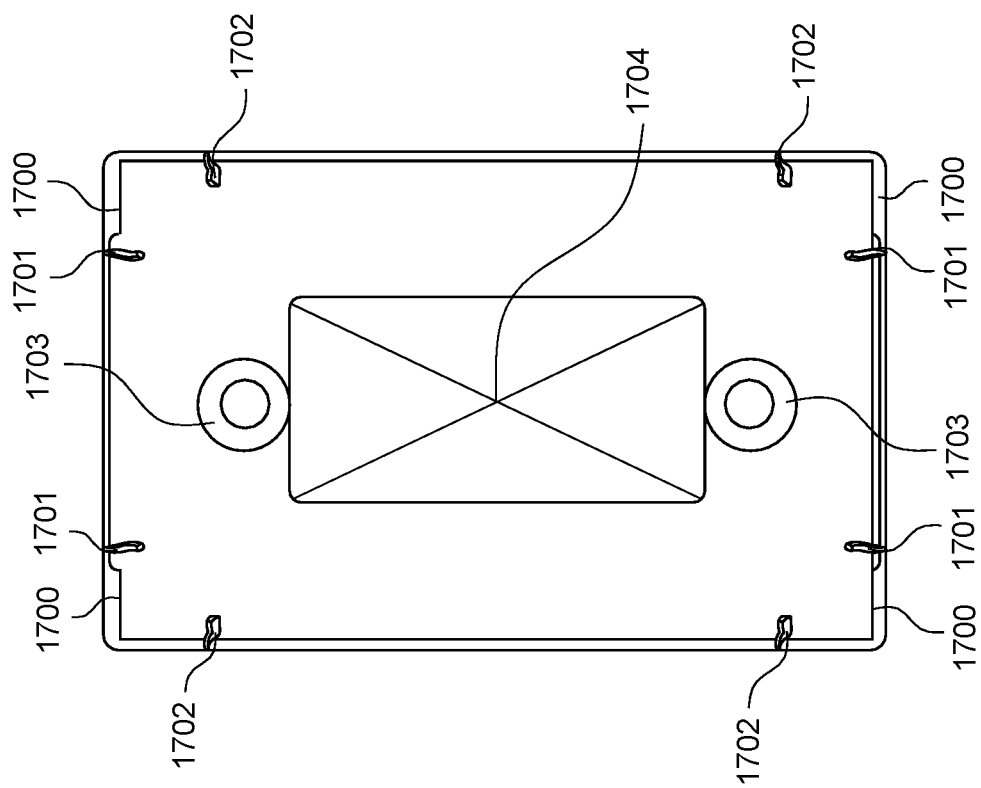
FIG. 17A shows the rear view of an example of a cover plate in decorator style designed for an embodiment of the baseplate, an embodiment of a light switch, and an embodiment of an electric component.
Figure 17D:
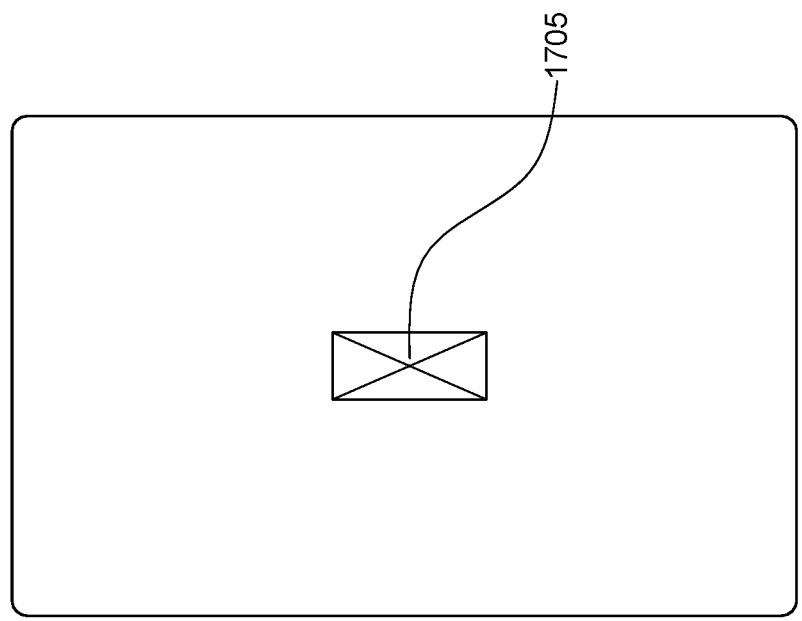
FIG. 17D shows a front view of an embodiment of the same cover plate as FIG. 17C.
Figure 17C:
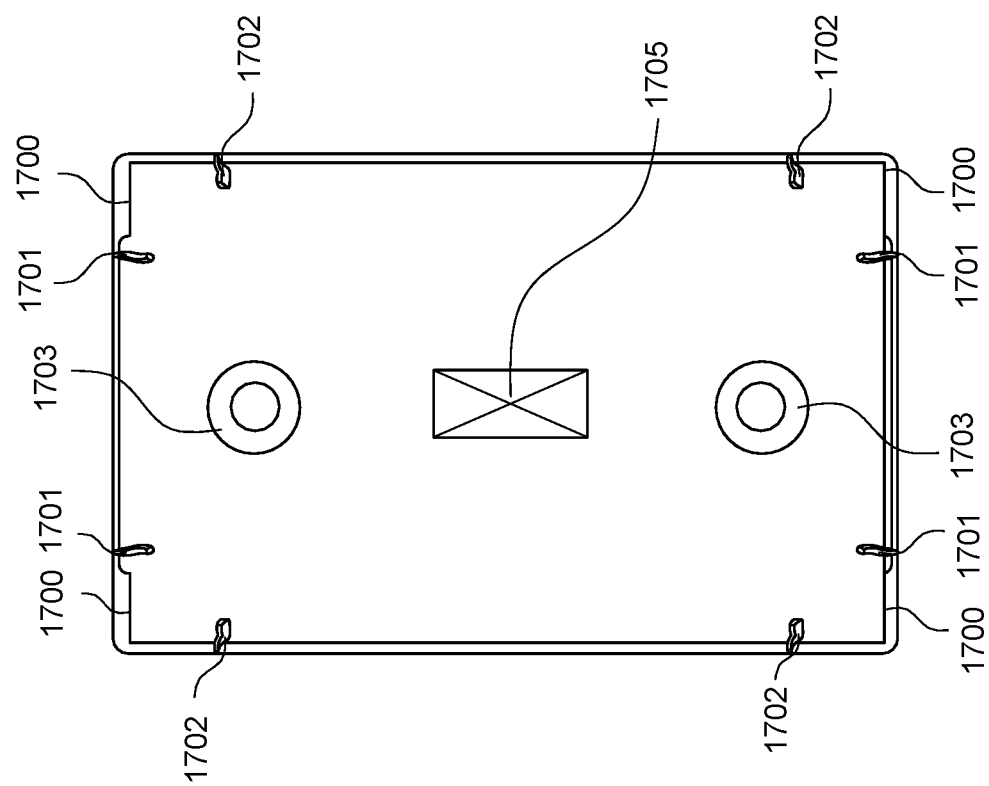
FIG. 17C shows the rear view of an example of a cover plate designed for an embodiment of the baseplate, an embodiment of a light switch, and an embodiment of an electric component, but styles for the design of a Toggle light switch.

FIG. 17A shows the rear view of cover plate in the decorator style designed for the baseplate with an embodiment of a light switch and an embodiment of an electric component (which may be included in an embodiment of system 100). FIG. 17B shows the same cover plate as FIG. 17A, but from the front. It is understood that cover plates match the style of light switch or electric component installed and may come in many design styles. For this reason, an example of another design style is shown in FIG. 17C, which is the rear view of cover plate designed for the baseplate, an embodiment of a light switch and an embodiment of an electric component, but styled for the design of a toggle light switch. These serve only as examples and not a limitation of the design styles that cover plates may be. FIG. 17D shows the same cover plate as FIG. 17C, but from a front view. 1700 depict small overhangs in the cover plate that are designed to mate (e.g., and snap) directly into matching mating protrusions found on baseplate, an embodiment of a light switch, and an embodiment of an electric component embodiments. When they are snapped together, the cover plate is held firmly in place. 1701 depicts various protrusions which are used to align and center the cover plate onto the baseplate or an embodiment of a light switch or an embodiment of an electric component. Additionally, the protrusions 1701 prevent undesired flexing of the sidewalls of the cover plate. 1703 depicts small circular recesses that may be present in cover plate embodiments for the purpose of making room for the large screws that are used to install a light switch or outlets into place. Depending on the screw used, the head of the screw may require additional room—which is what the circular recesses of 1703 allow for. 1704 may be the opening of the cover plate for the decorator style. 1705 may be the opening of the cover plate for the style of a toggle switch.

FIG. 18A depicts the rear view of a touch cover plate (which may be included in an embodiment of system 100). FIG. 18B may be the front view of a touch cover plate with examples of how touch gestures and buttons can be configured. A cover plate and or touch cover plate may have an appearance similar to a traditional faceplate in that it covers the exposed electrical elements of a light switch and/or electrical element and/or baseplate. The cover plate may be a non-electronic component (or, in other embodiments, the cover plate may include electronic components). The embodiment of the touch cover plate differs from a traditional faceplate and non-electronic cover plate in that it has an attached PCB element, connectors, and processors that work together to allow for capacitive touch and/or buttons to be present. When the cover plate includes these components, it is called a touch cover plate. 1800 may be a PCB that spans the entire inside area of the touch cover plate. 1801 and 1802 depict that the PCB 1800 has two circular cutouts for the purpose of not interfering with screw heads that may be present in this area from fastening a light switch or electric component into place. 1803 may be a connector on the PCB that is used to mate with the exposed PCB area found on an embodiment of the light switch or embodiment of the electric component 1306 and/or 1103. When the touch cover is installed on a baseplate without an embodiment of the light switch or an embodiment of an electric component, it may require the touch cover plate to connect and mate directly with the baseplate PCB. 1818 may be an embodiment of the baseplate, which may contain a mating connector 1819 for the touch-cover-plate-connector 1804. Additionally, this embodiment of the baseplate also contains a processor or other module with Wi-Fi and Bluetooth capabilities as depicted by 1820. When the touch cover plate is fully installed onto the baseplate 1818, the baseplate and touch cover can relay power and data communication to and from each other, via the mating connectors of 1819 and 1804. Likewise, if an embodiment of a light switch or embodiment of an electric outlet were to be present, it could also relay power and data communication, via the touch cover Connector 1804, and corresponding connector on an embodiment of the light switch 1103 or embodiment of an electric component 1306. 1806, 1807, 1808 and 1809 depict capacitive touch locations that represent virtual buttons. The entire surface of the touch cover plate is flat and smooth as depicted in the embodiment of FIG. 18B, but it is possible for the touch cover plate to contain physical buttons that can be pressed and depressed. Because the touch cover plate is mated with a baseplate, which may contain a processor and wireless communications, touch, multi-touch, and gesture controls, via capacitive touch can be enabled on the touch cover plate. A user may physically press the area of the touch cover plate depicted by a square in 1806, which may cause an event to happen. As an example, 1806 may be programmatically configured to cause any attached accessory on the baseplate to power off. As another example, touching the area depicted in 1807 may signal any attached speaker accessories on the baseplate to start playing music. As another example, touching the area of 1808 may cause any attached presence sensor LED lights to change color. Finally, as another example, pressing the area of 1809 may cause an external endpoint not directly connected to the baseplate or the touch cover plate to perform an action. To illustrate this, imagine there is a smart speaker, like the Amazon Echo (for example), plugged in somewhere in the home and is connected to the same Wi-Fi network as the baseplate. When the user presses the area outlined in 1809, it may be possible to relay a control, even via the Wi-Fi network, which sends a signal the smart speaker to start playing music. The amount of physical or capacitive buttons is virtually unlimited. Likewise, the use cases for the physical or virtual button are also virtually unlimited. Another use case for capacitive touch is gesture or swipe control. Unlike a button press, a swipe may require a user to press their finger at one starting point, and keep it pressed on the surface of the touch cover plate and swipe their finger in a direction for an extended period. 1810 may be an example of a starting point where a user presses down, and swipes left until they reach the end point depicted by 1811. This swipe gesture may be named Bottom Left Swipe. Like the capacitive buttons described above, gestures like the Bottom Left Swipe can be configured to perform an event. As an example, consider an embodiment in which there is a speaker accessory attached at the bottom attachment position of the baseplate that is actively playing music. When the user performs a Bottom Left Swipe gesture, signal events can be sent to the attached speaker accessory indicating a volume down event. As the user performs the Bottom Left Swipe, the volume level of the speaker can dynamically turn the volume down, as the user is swiping. If the user reaches the very left position of the swipe gesture, as depicted by 1811, the volume of the speaker accessory may be completely muted. As another example, 1816 may be the starting point of a swipe gesture that when pressed down and swiped all the way to the end position depicted by 1817, can be called Top Right Swipe gesture. This Top Right Swipe gesture can be used to relay events to an accessory attached at the top position of the baseplate. The Top Right Swipe gesture may also be used to control multiple accessories at the same time, and/or may control devices that are not accessories at all and/or may be used to control an external endpoint, via Wi-Fi or Bluetooth, like the Amazon Echo described above. The embodiment of FIG. 18 may also include one or more A multi touch gestures. 1812 and 1814 depict two different starting points for a swipe gesture. As an example, a user may use their index finger to start at 1812 and their middle finger to start at 1814 and continue to press and swipe both of their fingers in the downward direction until reaching point 1813 and 1815, which may be referred to as a multi touch swipe gesture or a Sliding Down multi touch gesture. As an example, the Sliding Down multi touch gesture may be used to control the dimming level of an installed light switch. As the user is performing the Sliding Down multi touch gesture, the lighting may dim in real-time to correspond to where they are in the gesture until the desired light brightness is reached. All of these are only examples of how capacitive touch and/or physical buttons may be used by the touch cover plate to enable virtually unlimited experiences. While gestures and touch events were described with a baseplate, they may also be performed with embodiments of light switches and/or embodiments of electric components that have a touch cover plate installed.

FIG. 18C shows a baseplate, which may be an embodiment of baseplate 107 (and may be part of system 100), and may have chip 1820. Chip 1820 may include a processor system having one or more processors that communicates with a memory system which may include machine instructions implement by the processor system. Chip 1820 may also include a communications system including at least transceiver, receiver, and/or transmitter (which may include an antenna) that communicate with the processor system and thereby enable the processor system to communications with other devices. The communications system may include a network interface for communicating via a local area network and/or a wide area network, such as the Internet. For example. The communications system may be for Wi-Fi, Bluetooth, infrared, radio frequency, optical, ultrasound, broadband, and/or sonic communications. The processor may receive communications from remote devices, via the communications system and in response send instructions to one or more accessories attached to baseplate 107 system 100.

Figure 19B:
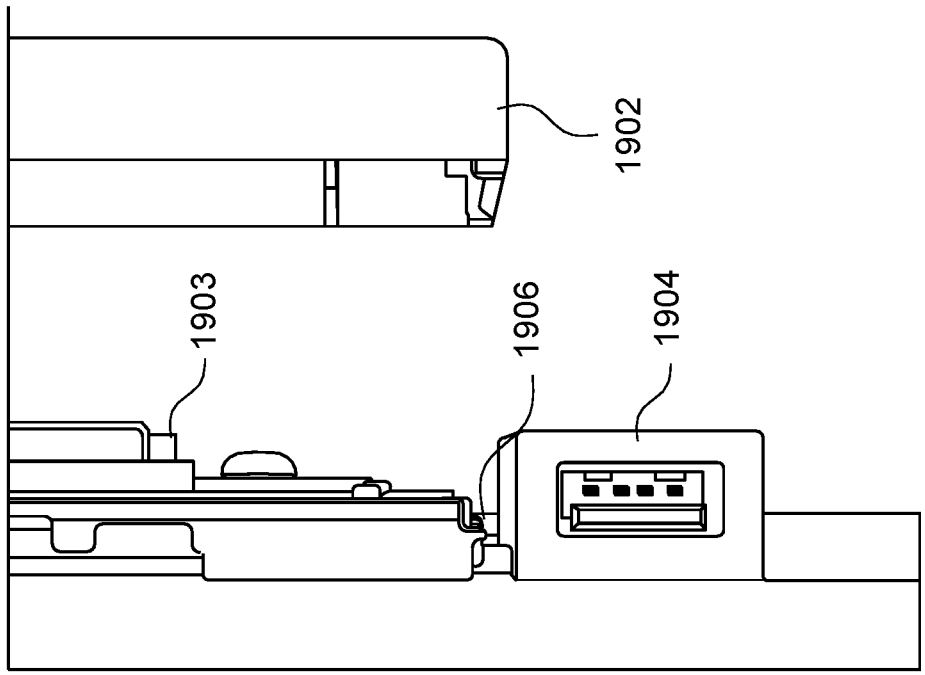
FIG. 19B shows the same depiction of an embodiment of the embodiment of FIG. 19A, but zoomed in to the bottom to show more detail.
Figure 19A:
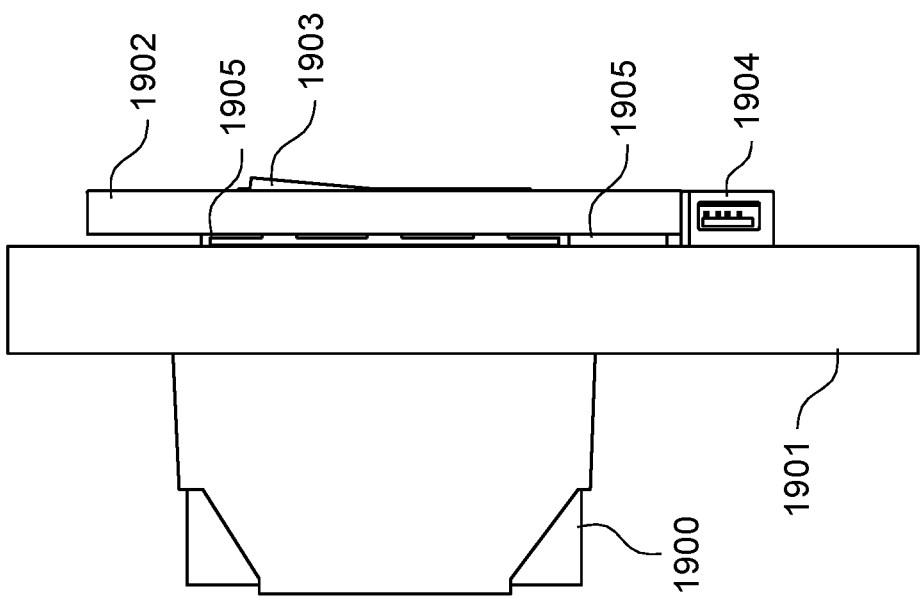
FIG. 19A shows a side view of an embodiment of fully assembled baseplate with a USB charging accessory installed on the bottom.

FIG. 19A shows a side view of fully assembled baseplate with a USB charging accessory installed on the bottom (which may be included in an embodiment of system 100). FIG. 19B shows the same depiction from FIG. 19A but zoomed in to the bottom to show more detail. 1900 shows the junction box, which is not normally seen from this perspective in the real world. 1901 shows a wall. 1902 shows a cover plate. 1903 shows a light switch. 1904 shows a USB charging accessory. The purpose of FIG. 19A, B is to show that there is a gap between an installed accessory and the baseplate that is used for the cover plate to fit into place. The gap can be seen at 1906. Notice that when the cover plate is fully installed like in FIG. 19A there is also a gap between the wall and the cover plate. This is depicted by 1905. This gap is present in order to allow accessories to make contact with the baseplate found underneath the cover plate. While a baseplate is shown here, the same gaps 1906 and 1905 may be present on fully assembled embodiments of a light switch with Accessory Attachment Modules installed and/or fully assembled embodiments of an electric component with Accessory Attachment Modules installed.

Figure 20A:
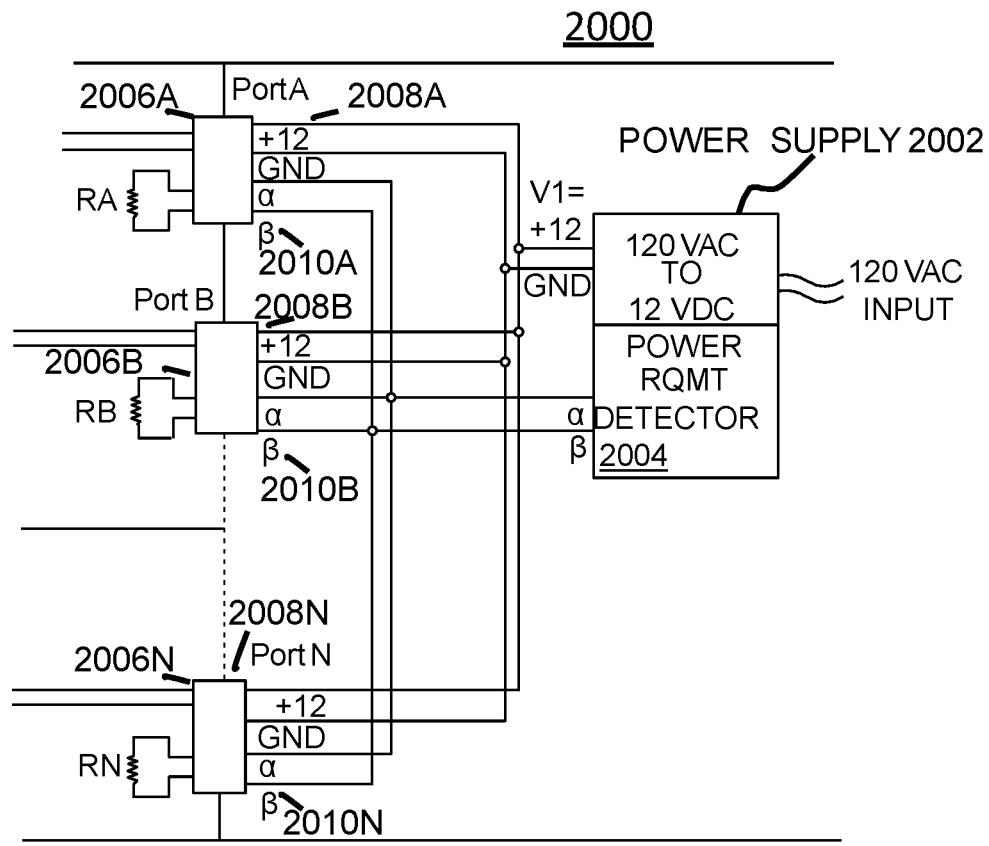
FIG. 20A shows a circuit diagram of an embodiment of a circuit associated with the panel of FIG. 1A.

FIG. 20A shows a circuit diagram of a circuit 2000 associated with system 100. Circuit 2000 distributes electricity from a source (e.g., the wall) to accessories, which may be the accessories attached to system 100. In the embodiment of FIG. 20A, circuit 2000 supplies a fixed voltage (e.g., V1) to each of the accessories, which in the example of FIGS. 20A-C 12 volts.

Power supply 2002 converts the voltage from the source to a desired voltage that is used by the accessories. For example, power supply 2002 may convert 120 volts to 12 volts or 220 volts to 6 volts. Power supply 2002 may also include (or may be coupled to) logic for determining when to shut off power supply 2002. The determination of whether to shut off the power supply may be based on whether the expected maximum power needed by the accessories currently connected to circuit 2000 exceeds the power available.

Power requirement detector 2004 detects the maximum power required by the totality of the accessories attached to circuit 2002. In an embodiment, if power requirement detector 2004 detects that the maximum power (or current) that may be required by the accessories attached to circuit 2002 is below a predetermined threshold, then power requirement detector does nothing, and as a result of the accessories attached to the panel are powered. By way of contrast, in this embodiment, if power requirement detector 2004 detects that the maximum power (or current) that may be required by the accessories attached to circuit 2002 is above a predetermined threshold, then a signal is sent to an electronic switch, which disconnects power supply 2002. In another embodiment, a signal is sent in either case, but the signal is either "high" or "low" and therefore different in each case. The predetermined threshold may be the maximum power (or current) that power supply 2002 is capable of delivering or capable of safely delivering. The predetermined threshold may be somewhat below the maximum power that power supply 2002 is capable of delivering, as a safety precaution.

Alternatively, power supply 2002 only stays on when a signal is produced by power requirement detector 2004 that the power currently required is below the predetermined threshold. In an embodiment, if the maximum power required by the accessories currently attached is below the predetermined threshold, and if power supply 2002 is off (e.g., as a result of previously having been shut off because the accessories attached required too much power), power supply 2002 is automatically turned on.

Ports 2006A-N are a series of one or more ports that are electrically coupled to power supply 2002. The accessories may be attached to any combination of ports 2006A-N. Each of ports 2006A-N may include two or more pairs of connectors, which may include pair of terminals 2008A-N and pair of terminals 2010A-N. Pair of terminals 2008-A-N may be for supplying power to the accessories, and may include one terminal connected to ground and second terminal connected to the high voltage output of power supply 2002. Pair of terminals 2010A-N (which are also labeled terminals α and β) may be for communicating information (and/or for interrogating the accessory) and may include one terminal (e.g., having a higher voltage) for receiving current supplied and lower voltage for a return current.

Figure 20B:
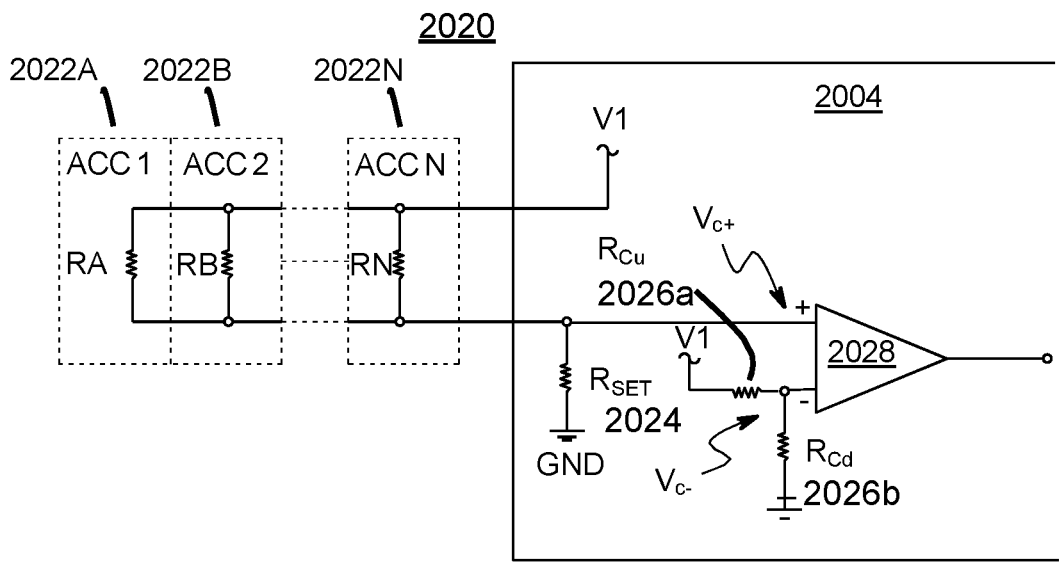
FIG. 20B shows a circuit diagram of an embodiment of power requirement detection circuit.

FIG. 20B shows an embodiment of power requirement detection circuit 2020. In the embodiment of FIG. 20B, power requirement detector 2004 may be connected to accessories 2022-A-N (or ACC 1-ACC N). Each of accessories 2022-A-N may be equipped with power indicators 2024A-N, which are attached to pair of terminals 2010A-N (FIG. 20A), respectively. In an embodiment, each of power indicators 2024A-N may include a resistor, which may be one of resistors RA-RN, which may be chosen to be indicative of the maximum current that the accessory to which it is attached will draw (in alternative embodiments, other electrical components may be used instead of and/or in addition to resistors). For example, each of resistors RA-RN may be a in the order of a small percentage (e.g., 1%) of the maximum load the corresponding accessory will place on power supply 2002. In an embodiment, power-requirement-detection-circuit 2020 may only be activated when a new accessory is attached (and/or when the user turns on power-requirement-detection-circuit 2020). For example, attaching a new accessory may automatically activate power-requirement-detection-circuit 2020, and optionally power-requirement-detection-circuit 2020 may automatically shut itself off, after the new accessory is attached. In an embodiment, power-requirement-detection-circuit 2020 may, additionally or alternatively be activated every time the panel is powered on. In an alternative embodiment, power indicators 2024A-N may send a message, such as a binary encoded value, indicative of the maximum power the accessory will draw. In an embodiment, a digital interface may be included for monitoring the results of and/or behaviors power-re-quirement-detection-circuit 2020.

Figure 20C:
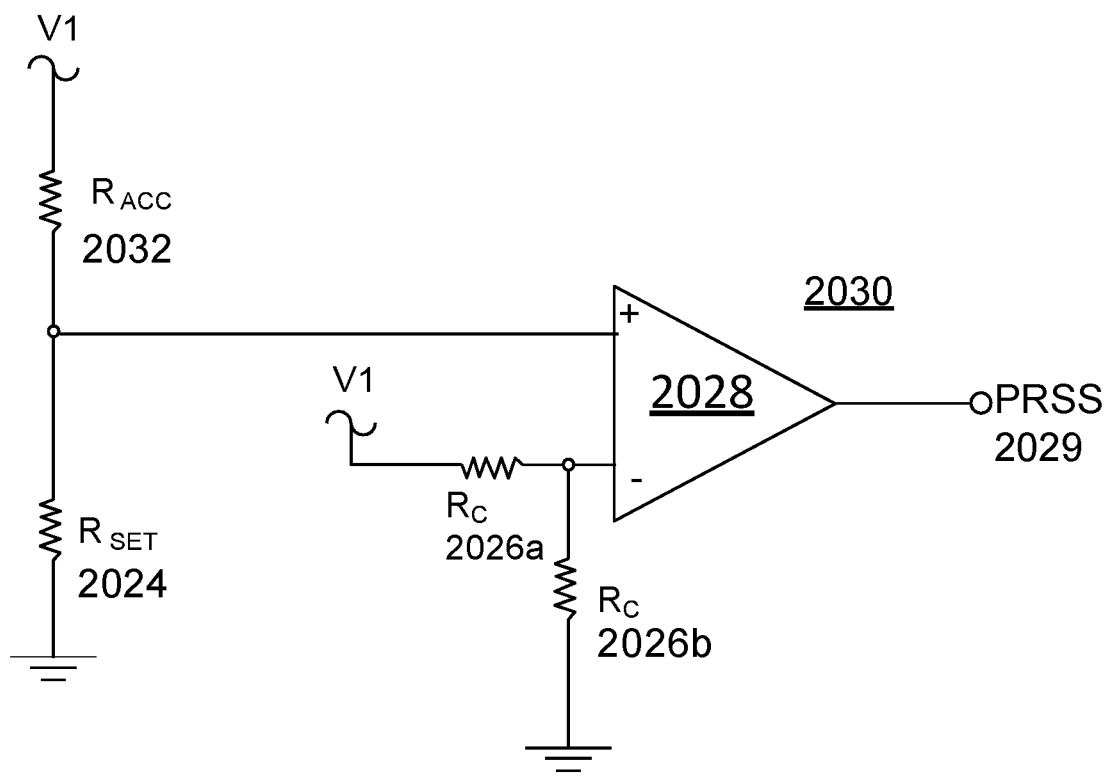
FIG. 20C shows an embodiment of a portion of the circuit of FIG. 20B.

FIG. 20C shows an embodiment 2030 of part of circuit 2000 of FIG. 20B. In the embodiment of FIG. 20C, the individual resistances of the current indicators of the accessories has been replaced with a resistor symbol labeled $R_{ACC}$ 2032 (which represents the effective resistance of all of the accessories currently attached to circuit 2000 together). Specifically, in this embodiment, $R_{ACC}$ may be computed by, $$1/R_{ACC}=1/RA+1/RB+\ldots 1/RN.$$

Since, in this embodiment, the comparator draws relatively little current, the voltage one input of the comparator (e.g., the plus input) may be given by, $$Vc+=V1*Rset/(-R_{ACC}+Rset)$$

So that as more accessories are added, $R_{ACC}$ 2032 is lowered, which thereby decreases the voltage drop across $R_{ACC}$ and increases the voltage Vc+, in the embodiment shown in FIGS. 20B and 20C. Power requirement detector 2004 may include a high voltage output 2026a (which may have voltage V1), which powers the power requirement indicators 2024 and a comparator 2028. Comparator 2028 compares the return voltage across accessories 2022A-N to a fixed reference voltage. If, as a result of the comparison, the return current from accessories 2022A-N is higher than the reference current. The return current from accessories 2022A-N being higher than the reference current, indicates that the total of the maximum currents required by the accessories is higher than the current available from the power supply, and therefore also indicates that the total of the maximum power required by the accessories is greater than the power available from the power supply. In an embodiment, comparator 2028 may be an operational amplifier. In the embodiment of FIGS. 20B and 20C, the resistors Rcu 2026a and Rcd 2026b, may form a voltage divider that may determine the voltage drop from V1 to the junction between Rcu 2026a and Rcd 2026b, where the reference voltage is given by $$Vc-=V1*Rc/(Rcu+Rcd)$$

In the embodiment of FIG. 20C, the two resistances Rcu and Rcd are chosen to be the same, and that resistance may be denoted as Rc. In other words, Rcu=Rcd=Rc, so that Vc=−V1/2 (or in other words, as a result of the resistances Rcu and Rcd being the same, the voltage at the comparator is half V1). However, other values for Rcd 2026a and Rcu 2026b could be chosen to other values instead. In the embodiment of FIGS. 20A-20C, if Vc+>Vc−, comparator 2028 outputs a high voltage at PRSS 2029, which turns off power supply 2002. In an embodiment, the ratio of (1) the effective resistance of each accessory to (2) the resistance of the resistor that the accessory uses for indicating the maximum current is the same for each accessory. Since the ratio of (1) the effective resistance of each accessory to (2) the resistance of the resistor that indicates the maximum current is the same for each accessory, the change in the effective resistance of the $R_{ACC}$ 2032 is proportional the change in the effective resistance resulting from adding an accessory to the power output of power supply 2002. In an alternate embodiment, the maximum permissible loads (and therefore the resistor set points) may optionally be set to different values. In alternative embodiments, the reference voltage may be Vc+ and the power requirement indicators 2022B are connected to Vc−, and then when the output of comparator 2028 is low, the power supply is shut off. In yet another embodiment, the accessories, and the power indicators of this application, may be powered with AC electricity. In an embodiment, the accessories and power indicators of this application may be powered with AC electricity instead of DC electricity. Although in the embodiments of FIGS. 20A-20C resistors are used to divide the voltage, capacitors and/or inductors may be used instead. Although in the embodiment of FIGS. 20A-20C, the accessories, and the voltage indicators, are arranged in parallel, in an alternative embodiment, the accessories and the voltage indicators could be arranged in series.

FIGS. 21A, B, C, D, E, and F depict six different ways for how power can be obtained by one or more attached accessories (which may be included in an embodiment of system 100). These are intended for examples of how power can be distributed, but it is generally understood that many variations may exist. 2100 may be a system where high voltage alternating current 2101 (AC) is converted to Direct Current (DC) via a dedicated power supply (PSU) 2102. The PSU 2102 then connects its DC output to the baseplate 2103. The baseplate then makes DC power available to any attached accessories 2104. 2105 may be a similar system as 2100 except that instead of a dedicated power supply, the power supply is part of the baseplate circuitry. 2106 may be AC current flowing directly to the baseplate circuitry 2107 that is designed to receive it. The baseplate circuitry of 2107 may distribute DC current to any attached accessories 2108. 2109 may be a system similar to 2100, but instead of a dedicated PSU the PSU component are located inside of an embodiment of an electric outlet. AC current 2110 may flow directly into the electrical outlet 2111. The electric outlet may have a connector or special designated area where DC output can be connected directly to the baseplate 2112. The baseplate can be then make the DC power available to any attached accessories 2113. 2114 shows a similar system as 2109 except that an embodiment of a light switch with built in PSU circuitry is depicted instead of an electrical outlet. AC current 2115 may flow directly into the light switch containing an AC to DC power supply 2116. The light switch 2116 may have a connector or special designated area where DC output can be connected directly to the baseplate 2117. The baseplate can be then distribute DC power available to any attached accessories 2118. 2119 shows a system where the AC to DC PSU is located on the attached accessory itself. AC current 2120 may flow directly to the baseplate 2121. The baseplate may distribute the AC power directly to any attached accessories 2122. Any attached accessories may then convert AC to DC for their own use. 2123 shows a system where high voltage AC is used all the way through without any conversion to DC. AC power 2124 flows directly to the baseplate 2125. The baseplate then makes AC power available to any attached accessories 2126. The accessory can make use of the AC power and/or further extend the AC power to another attached device. Any of embodiments of FIGS. 21A-F, may include a processor system having one or more processors communicatively coupled to a memory system, and the processor systems, the processors, and/or the memory systems may each be in any of the baseplate, power supply, and/or accessories.

Any of the embodiment of this specification may be included in one or more embodiments of system 100.

ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
   (a) a baseplate that is attachable to a structure, the structure being in a vicinity of a power source,
   (b) the baseplate including at least one or more attachment points, either built in or attached to, the baseplate, that mechanically attach to corresponding attachment points on one or more electrical components, wherein the one or more electrical components are removably, mechanically connectable to said baseplate by the one or more attachment points, and
   c) the baseplate having at least one hole in which at least one electrical component fits;
   a cover plate that attaches to the baseplate, via one or more mechanical connectors that are attached to at least one of the baseplate and the cover plate, and that holds the cover plate to the baseplate;
   a spacer, wherein at least one electrical component mounts on the spacer, and the spacer spaces the electrical component from the structure, wherein the spacer positions the electrical component further away from the structure than the electrical components would otherwise be were the spacer not present, wherein the electrical component is lifted away for the structure by a plurality of regions to create a gap via which one or more accessories are connected to the baseplate, wherein the regions comprising a series of the one or more protusions, and a plurality of depressions between the protrusions, wherein the depressions in the regions create the deepest points of the baseplate;
   a power supply that electrically connects to the one or more electrical components; and
   the one or more electrical components being removably attachable to the baseplate.

2. The system of claim 1, wherein the electrical component is a light switch.

3. The system of claim 1, wherein the electrical component is an electric receptacle.

4. The system of claim 1, the cover plate including one of the one or more electrical components.

5. The system of claim 4, the cover plate having a user interface.

6. The system of claim 1, the one or more electrical components including a battery.

7. The system of claim 6, the battery supplying power to the one or more other electrical components.

8. The system of claim 1, wherein the one or more electrical components including the one or more accessories, which when attached to the baseplate extend laterally in a direction parallel to the baseplate.

9. The system of claim 1, the one or more electrical components including at least one accessory, the at least one accessory being attachable to the baseplate at a plurality of different locations on the baseplate, allowing a user to choose between which of the plurality of different locations the at least one accessory is to be attached.

10. The system of claim 1, comprising a transformer that converts a voltage output of the power source to a voltage for operating the one or more electrical components.

11. The system of claim 1 the power supply that electrically connects to the power source, the power supply supplying power to the one or more electrical components.

12. The system of claim 11, further comprising a power shutoff unit that limits a total amount of power supplied, so that the power supplied is no more than a predetermined threshold.

13. The system of claim 11, further comprising a shutoff unit that limits the total current that the power supply supplies, so that the current supplied is no more than a predetermined threshold.

14. The system of claim 11, further comprising
   a detector that detects a current required by the one or more electrical components, and
   a shutoff unit that determines whether the current required is more than a predetermined threshold, wherein the shutoff unit is connected to the power supply, and the shutoff unit disconnects the power supply when the current required is greater than the predetermined threshold.

15. The system of claim 1, the one or more electrical components including at least a first electrical component being electrically coupled to at least a second electrical component.

16. The system of claim 15, at least the first electrical component transmitting power to at least the second electrical component.

17. The system of claim 15, at least the first electrical component transmitting data to at least the second electrical component.

18. The system of claim 15, further comprising
   a processor system;
   at least the first electrical component being communicatively coupled to the processor system; and
   at least the second electrical component being communicatively coupled to the processor system.

19. The system of claim 18, further comprising a receiver; the processor system being communicatively coupled to the receiver.

20. The system of claim 19, the receiver including an antenna.

21. The system of claim 18, the processor system including memory storing one or more machine instructions, which when implemented causes the processor to carry out a method including at least
   receiving, by a receiver, a message;
   in response to receiving the message,
   determining by the processor whether to send an instruction for at least the first electrical component to at least the first electrical component based on the message received, and sending the instruction for at least the first electrical component to at least the first electrical component if it was determined to send the instruction for at least the first electrical component to at least the first electrical component; and
   determining by the processor whether to send an instruction for at least the second electrical component to at least the second electrical component based on the message received, and sending the instruction for at least the second electrical component to at least the second electrical component if it was determined to send the instruction for at least the second electrical component to at least the second electrical component.

22. The system of claim 15, further comprising
   a communication system;
   at least the first electrical component being communicatively coupled to the communication system; and at least the second electrical component being communicatively coupled to the communication system.

23. A method comprising:
installing a baseplate on a structure in a vicinity of a power source;
removably attaching one or more electrical components to the baseplate including at least mounting an electrical component of the one or more electrical components on at least one spacer, therein spacing by the spacer the electrical component away from the structure, wherein the electrical component is lifted away for the structure by a plurality of regions to create a gap via which one or more accessories are connected to the baseplate, wherein the regions comprising a series of the one or more protusions, and a plurality of depressions between the protrusions, wherein the depressions in the regions create the deepest points of the baseplate; and
electrically attaching the one or more electrical components to the power source;
the baseplate including at least one or more attachment points, either built in or attached to, the baseplate, that mechanically attach to corresponding attachment points on one or more electrical components, wherein the one or more electrical components are removably, mechanically connectable to said baseplate by the one or more attachment points, and the baseplate having at least one hole in which at least one electrical component fits;
the baseplate being part of a system that includes at least
a cover plate that attaches to the baseplate, via one or more mechanical connectors
that are attached to at least one of the baseplate and the cover plate, and that holds the cover plate to the baseplate; and
a spacer, wherein at least one electrical component mounts on the spacer, and the spacer spaces the electrical component from the structure;
wherein
the power source including at least a power supply; and
the one or more electrical components are removably attachable to the baseplate.

24. The method of claim 23, further comprising:
installing a power supply, by electrically coupling a first point of the power supply to the power source and electrically coupling a second point of the power supply to the one or more electrical components.

25. The method of claim 24, the electrically coupling of the second point of the power supply including at least electrically coupling the second point of the power supply to the baseplate, and electrically coupling the one or more electrical components to the baseplate.

26. The method of claim 23, further comprising: attaching the cover plate to the baseplate.

27. A method comprising:
powering one or more electrical components by at least
transforming, by a power supply, a voltage from the voltage supplied by a power source to a voltage required by the one or more electrical components; and
sending a current from the power supply, via one more electrical connectors associated with a baseplate, to the one or more electrical components;
the baseplate being attached to a structure having the power source; and
the one or more electrical components being removably attached to the baseplate;
wherein
(a) the baseplate that is attachable to a structure, the structure being in a vicinity of a power source,
(b) the baseplate including at least one or more attachment points, either built in or attached to, the baseplate, that mechanically attach to corresponding attachment points on one or more electrical components, wherein the one or more electrical components are removably, mechanically connectable to said baseplate by the one or more attachment points, and
(c) the baseplate having at least one hole in which at least one electrical component fits;
a cover plate that attaches to the baseplate, via one or more mechanical connectors that are attached to at least one of the baseplate and the cover plate, and
that holds the cover plate to the baseplate;
the baseplate being part of a system including at least
a spacer, wherein at least one electrical component mounts on the spacer, and the spacer spaces the electrical component from the structure, wherein the spacer positions the electrical component further away from the structure than the electrical component would otherwise be were the spacer not present, wherein the electrical component is lifted away for the structure by a plurality of regions to create a gap via which one or more accessories are connected to the baseplate, wherein the regions comprising a series of the one or more protusions, and a plurality of depressions between the protrusions, wherein the depressions in the regions create the deepest points of the baseplate; and
a power supply that electrically connects to the one or more electrical components.

28. The method of claim 27 further comprising:
powering a first electrical component of the one or more electrical components by a battery in another electrical component of the one or more electrical components.

29. The method of claim 27 further comprising transmitting power from a first electrical component of the one or more electrical components to a second electrical component of the one or more electrical components.

30. The method of claim 27 further comprising transmitting data from a first electrical component of the one or more electrical components to a second electrical component of the one or more electrical components.

31. The method of claim 27, further comprising:
receiving a message by a receiver;
in response to receiving the message,
determining by a processor whether to send an instruction for a first electrical component to the first electrical component based on the message received, and sending the instruction for the first electrical component to the first electrical component if it was determined to send the instruction for the first electrical component to the first electrical component; and
determining by the processor whether to send the instruction for a second electrical component to the second electrical component based on the message received, and sending the instruction for the second electrical component to the second electrical component if it was determined to send the instruction for the second electrical component to the second electrical component.

32. The system of claim 1, further comprising at least an electrical device coupled, via at least one of the one or more electrical components, to the baseplate.

* * * * *